United States Patent
Nikopour et al.

(10) Patent No.: US 10,638,478 B2
(45) Date of Patent: Apr. 28, 2020

(54) METHOD AND SYSTEM FOR DISTRIBUTED RESOURCE MANAGEMENT IN VEHICULAR AD-HOC NETWORKS

(71) Applicant: HUAWEI TECHNOLOGIES CO., LTD., Shenzhen (CN)

(72) Inventors: Hosein Nikopour, Ottawa (CA); Kelvin Kar Kin Au, Kanata (CA)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 14/676,434

(22) Filed: Apr. 1, 2015

(65) Prior Publication Data
US 2016/0295589 A1 Oct. 6, 2016

(51) Int. Cl.
*H04W 72/04* (2009.01)
*H04W 4/02* (2018.01)
*H04W 84/18* (2009.01)

(52) U.S. Cl.
CPC ....... *H04W 72/0453* (2013.01); *H04W 4/023* (2013.01); *H04W 84/18* (2013.01)

(58) Field of Classification Search
CPC ............. H04W 72/0446; H04W 72/04; H04W 72/048; H04W 72/06; H04W 72/10; H04W 72/0406; H04W 72/02; H04W 84/18; H04W 4/023; H04W 4/005; H04W 40/20; H04W 74/08; H04W 76/023;
(Continued)

(56) References Cited

U.S. PATENT DOCUMENTS 5,737,704 A * 4/1998 Jin ................ H04W 16/02 455/450
8,971,926 B2 * 3/2015 Grunebach ........... H04W 4/02 455/456.3
(Continued)

FOREIGN PATENT DOCUMENTS

CN 1254146 C 4/2006
CN 103096327 A 5/2013
(Continued)

OTHER PUBLICATIONS

Hosein Nikopour, Sparse Code Multiple Access, Sep. 2013, IEEE, 2013 24th Internation Symsposium on Personal Indoor and mobile radio Communications (PIMRC).*
(Continued)

*Primary Examiner* — Ricardo H Castaneyra
(74) *Attorney, Agent, or Firm* — Slater Matsil, LLP

(57) ABSTRACT

Methods and systems relating to de-centralized communication resource sharing and access for mobile nodes, such as vehicles, in a vehicle to vehicle ad hoc network are provided. A method includes receiving, at a first node, information indicating a position of a second node in the network. The first node may claim a communication channel in the network based on a position of the first node relative to the position of the second node. The relative positions of the nodes may be based on the distance of each node to a reference location. The nodes may be in a first zone in a virtual grid in the network, and the claimed communication channels may be channels of the first zone. Channels from other zones may also be claimed by nodes in the first zone as secondary channels.

25 Claims, 14 Drawing Sheets

(58) Field of Classification Search
CPC ........... H04W 28/044; H04W 72/0453; H04W 64/00; H04W 88/02; H04W 48/16; H04W 74/04; H04W 28/26; H04L 27/2655; H04L 1/1829; H04L 5/0023; H04L 47/10
USPC ...................................................... 370/329
See application file for complete search history.

(56) References Cited

U.S. PATENT DOCUMENTS

| | | | |
|---|---|---|---|
| 2004/0028015 | A1 | 2/2004 | Fouilland et al. |
| 2006/0109831 | A1* | 5/2006 | Tillotson ........... H04W 72/0446 370/342 |
| 2007/0280153 | A1* | 12/2007 | Sinha .................... H04W 16/12 370/328 |
| 2014/0307633 | A1* | 10/2014 | Soulie ................. H04W 72/048 370/328 |
| 2015/0077270 | A1* | 3/2015 | Rubin ...................... G08G 9/02 340/903 |
| 2015/0094057 | A1* | 4/2015 | Lu ......................... H04W 8/005 455/434 |
| 2015/0163720 | A1* | 6/2015 | Cordeiro De Oliveria Barros ..... H04W 40/20 370/254 |
| 2016/0142491 | A1 | 5/2016 | Engel et al. |
| 2016/0286550 | A1* | 9/2016 | Zhang ............... H04W 72/0446 |

FOREIGN PATENT DOCUMENTS

| | | |
|---|---|---|
| CN | 103220814 A | 7/2013 |
| CN | 103248640 A | 8/2013 |
| CN | 103415082 A | 11/2013 |
| CN | 104349280 A | 2/2015 |
| DE | 102013222174 A1 | 12/2014 |
| EP | 2789139 A1 | 10/2014 |
| JP | 2009016900 A | 1/2009 |
| JP | 2013138505 A | 7/2013 |
| JP | 2015162877 A | 9/2015 |
| JP | 2016504787 A | 2/2016 |
| WO | 0247416 A1 | 6/2002 |
| WO | 2014072849 A1 | 5/2014 |

OTHER PUBLICATIONS

Ke, W. et al.: "A Decentralized Adaptive TDMA Scheduling Strategy for VANET," IEEE WCNC Workshop on Applications of Delay Tolerant Networking (-DTN), Dec. 31, 2013, pp. 216-221.

ITU-R, "Future technology trends of terrestrial IMT systems, M Series, Mobile, radiodetermination, amateur and related satellite services", International Telecommunication Union, ITU-R Radiocommunication Sector of ITU, Nov. 2014, 33 Pages.

Taherzadeh, M., et al., "SCMA Codebook Design", 2014 IEEE 80th Vehicular Technology Conference (VTC2014—Fall), Sep. 14-17, 2014, 5 Pages.

* cited by examiner

METHOD AND SYSTEM FOR DISTRIBUTED RESOURCE MANAGEMENT IN VEHICULAR AD-HOC NETWORKS

FIELD OF THE DISCLOSURE

The present disclosure relates generally to ad hoc networks, and more particularly to communication resource multiple access in vehicular ad hoc networks.

BACKGROUND

Vehicle to vehicle communications are attracting more attention recently, partly as a result of developments in certain areas, for example intelligent transportation systems (ITS) for dedicated shorter range communications, and wireless ad hoc networking.

A vehicle to vehicle (V2V) communication network allows vehicles to talk to one another. A related type of network is a vehicle to infrastructure (V2I) communication network, which allows vehicles to talk with roadside infrastructure, such as roadside units. Vehicles and roadside units are communicating nodes in these V2V and V2I networks. The nodes may exchange information for one or more purposes, for example including but not limited to providing safety warnings (e.g. actual or potential vehicular collision warnings), cooperative driving information, traffic information, traffic control, driver assistance, or policing functions.

V2V ad-hoc networks and are sometimes referred to as VANET. These ad-hoc networks typically have a distributed network architecture, and lack a central controller. In these types of networks, resource management is usually an important consideration. Resource collisions, caused by two nodes trying to use the same resource in an overlapping fashion, and uncontrollable delay are just some concerns in these types of networks, particularly in relation to safety related communications or other high priority communications, which may require fast and reliable transmission.

SUMMARY

In at least one aspect, the present disclosure is directed to a method in a vehicle to vehicle ad hoc network, comprising receiving, at a first node in the network, information indicating a position of a second node in the network, and claiming, at the first node, a first communication channel in the network based on a position of the first node relative to the position of the second node.

In at least another aspect, the present disclosure is directed to a first node for operating in a vehicle to vehicle ad hoc network, the first node comprising a processor, a communications subsystem, and a computer readable storage medium storing instructions that when executed by the processor cause the first node to decode a position of a second node in the network from information received through the communications subsystem, and transmit a message indicating the claiming of a first communication channel in the network for the first node, the first communication channel being selected based on a position of the first node relative to the position of the second node.

BRIEF DESCRIPTION OF THE DRAWINGS

The present disclosure will be better understood having regard to the drawings in which.

DETAILED DESCRIPTION

Figure 1:
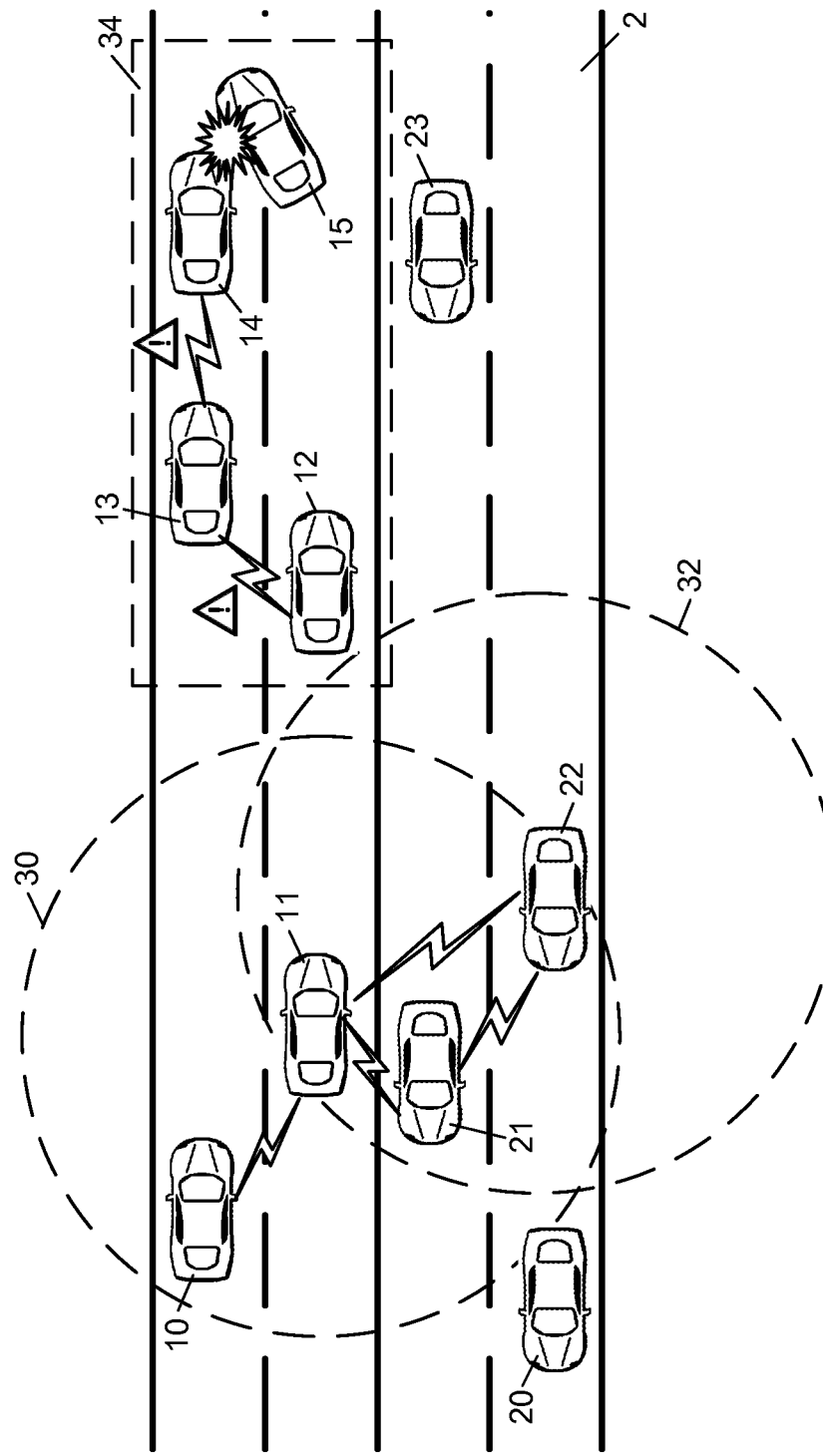
FIG. 1 is a representation of vehicles traveling in opposite directions along a road according to at least one embodiment of the present disclosure.

Embodiments described herein relate to vehicle communications, including vehicles, vehicle to vehicle communications, and vehicular ad hoc networks. However, the scope of the present disclosure is not intended to be limited to vehicles or vehicle communications. The teachings of the present disclosure may be used or applied in or with other types of nodes, including other types of mobile nodes, in other applications and in other fields.

According to at least one aspect of the present disclosure, one or more approaches are provided for the claiming of resources by vehicles in a vehicular ad hoc network. The term claiming may be used to refer to the use or reservation of a shared communication resource by a vehicle in an ad hoc network. Instead of a vehicle being allocated a channel by another entity, such as a central authority responsible for allocating resources to multiple vehicles, a vehicle may claim a resource for itself. Vehicles may use information about their environment, including information associated with other vehicles, to claim and use a particular resource. The vehicles may base their claiming of resources on an algorithm, set of rules, etc. in order to minimize or eliminate the chance of resource collisions.

According to at least another aspect of the present disclosure, one or more approaches are provided for enabling one or more vehicles to enter a network, for example a vehicular ad hoc network.

According to at least another aspect of the present disclosure, one or more approaches are provided for enabling the recovery of blind vehicles, for example in vehicular ad hoc networks. A vehicle is "blind" when it fails to receive sufficient information to enable it to perform necessary functions, such as claiming a resource for an upcoming time frame.

According to at least another aspect of the present disclosure, resources in an ad hoc network may be defined based on Sparse Code Multiple Access (SCMA).

According to at least another aspect of the present disclosure, one or more approaches are provided for achieving a virtual full duplex communication mode for vehicles in an ad hoc network.

Vehicle to vehicle communications may be loosely grouped into communications for safety related applications and communications for non-safety applications. Safety related communications may include information related to, for example, cooperative forward vehicular collision warnings, such as for example emergency braking or blind spot warning, as well as hazardous location vehicle to vehicle notifications, such as icy road surface ahead warnings. These are only a few examples.

Non-safety applications may be used to provide other functions or services relating to vehicles and transportation systems. Non-safety applications may relate to, for example, traffic reporting, traffic congestion avoidance, traffic routing, providing internet or other data communications for vehicles, etc. Various other types of non-safety applications exist and are possible.

The exchange of information in safety related applications may be subject to different quality of service (QoS) requirements than exchanges in non-safety applications. For example, it may be important that certain types of safety related information be delivered quickly, i.e. with low latency, and reliably, i.e. with a high degree of success. It may be generally desirable that cooperative vehicular collision warning information be communicated promptly and dependably so that a vehicular collision warning application may provide a timely indication or response.

In vehicular networks, safety related communications are often of a broadcast nature. Safety applications may be supported by protocols, such as network or transport protocols, even including specific V2V protocols. For example, one V2V protocol, dedicated short range communications (DSRC), is based on the IEEE 802.11p standard, which is an enhancement of IEEE 802.11 that adds wireless access in vehicular environments (WAVE), a vehicular communication system. The enhancements are intended to support Intelligent Transportation Systems (ITS) applications. According to IEEE 802.11p, communications take place over a dedicated 75 MHz spectrum band around 5.9 GHz (5.850-5.925 GHz). Communications may have a maximum range of approximately 1000 m.

Medium access control (MAC) protocols of VANET) generally resolve contentions amongst vehicles for channel access. In existing V2V network implementations, a random access mechanism in DSRC relies on carrier sense multiple access/collision avoidance (CSMA/CA). MAC protocols used in existing V2V networks for resolving contentions between vehicles may provide sufficient latencies when there are few vehicles in a defined area that are attempting to access the same radio resources. However, these protocols may cause higher unacceptable latencies when there are more vehicles in the area attempting to access the same resources. The higher latencies may be at least partially due to longer contention periods for some of the vehicles.

In addition, other factors may complicate channel access or other radio resource management in vehicle to vehicle ad hoc networks. These include the constantly changing physical locations of nodes (e.g. vehicles, etc.) within the network as well as the changing positions of vehicles relative to one another.

Safety related communications in vehicular networks may include various types of road safety messages, for example one or both of cooperative awareness messages (CAM) and decentralized environmental notification messages (DENM). CAM and DENM messages may be of a broadcast nature. A cooperative awareness message (CAM) provides information about the transmitting vehicle to its neighboring vehicles. This type of message may include information on the vehicle, for example its presence, location, kinematics, and other status information. A CAM may be a periodic short message in the form of a beacon or heartbeat message. Thus in this sense, a CAM is a time driven message. For example, a CAM message may be broadcasted at a frequency in the range of 1-10 Hz, have a maximum latency of approximately 100 ms, and a length of up to 800 bytes. However, these values are merely examples. Furthermore, CAM messages may be broadcasted within an immediate neighborhood of the transmitting vehicle.

On the other hand, a decentralized environmental notification message (DENM) may be an event driven message that is broadcasted to alert one or more other vehicles of an event or situation, such as an accident, or to any other type of event or information. Therefore unlike a CAM message, a DENM message is generally not a periodic message. As an example only, a DENM may have a maximum latency of 100 ms and a length shorter than a CAM message (e.g. less than 800 bytes). In addition, DENM messages may be broadcasted within an area based on the location of the event. The area may be referred to as a relevance area of the event.

Reference is now made to FIG. 1, which is a representation of multiple cars or other vehicles on a road 2. As an aside, it is to be noted that the relative sizes of objects and the distances between them in the figures of the present disclosure are used for illustrative purposes only and are not necessarily to scale.

Vehicles 10 through 15 are shown traveling in one direction, while other vehicles 20 through 23 are traveling in the opposite direction. At least some of the vehicles may have vehicle to vehicle communications capabilities.

For example, vehicle 11 may have a minimum awareness range indicated by circular line 30. Typically the awareness range refers to the maximum distance at which the vehicle 11 can be from another vehicle and still remain within communications range. Therefore vehicle 11 may be able to receive messages from other vehicles with this range, in this example, vehicles 10, 21 and 22, and therefore may be aware of these vehicles and receive information from and about them. Vehicle 11 may also broadcast messages to provide information to other nearby vehicles, such as vehicles 10, 21 and 22. These broadcasted and received messages may be CAM messages providing presence, position, kinematics, and or other status or other information, DENM messages, or any other type of messages or communications.

In a similar way, vehicle 22 may have a minimum awareness range indicated by circular line 32. Therefore vehicle 22 may be aware of vehicles 11 and 21, and may receive information from them. Vehicle 22 may also transmit information, which may be received by vehicles 11 and 21. Vehicle 22 may use broadcast transmissions, point to point transmissions, or point to multi-point transmissions. In one embodiment all messages are broadcast transmissions, and in the following descriptions this language is used, although one skilled in the art will appreciate that other transmissions types can be used.

In addition, event based messages, such as DENM messages, may be broadcasted or relayed by vehicles. For example, in the example of FIG. 1, vehicle 14 may be involved in a vehicular collision with vehicle 15 and therefore may broadcast a DENM or similar type message to alert others vehicles of the hazard. In the example, a DENM message from vehicle 14 may be received by vehicle 13, which may in turn rebroadcast the information in another message, which may be received by vehicle 12. Vehicle 12 may be out of range of vehicle 14 at the time of the transmission of the DENM message and therefore may not receive the original broadcast from vehicle 14. The broadcasting and relaying of DENM messages may be limited to a particular geographic area, for example a relevance area 34.

FIG. 1 is merely an example illustrating some types of vehicle to vehicle messaging in some situations. It is not meant to be limiting.

Figure 2:
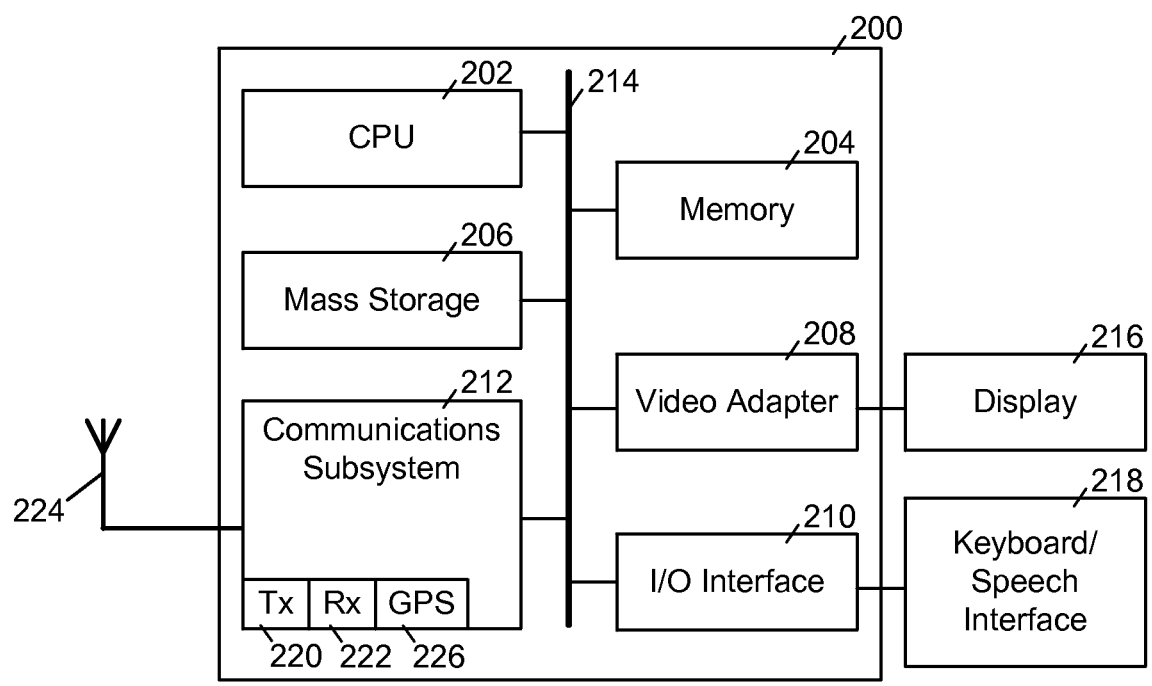
FIG. 2 is a block diagram of an example processing system in at least one embodiment.

Reference is now made to FIG. 2, which shows an example system that may be used with a vehicle to provide processing or communications functions, for example vehicle to vehicle communications.

FIG. 2 is a block diagram of an example processing system 200 that may be used for implementing at least some of the nodes, devices and methods disclosed herein. The processing system 200 may include one or more of a central processing unit (CPU) 202, memory 204, a mass storage device 206, a video adapter 208, an I/O interface 210, and a communications subsystem 212. One or more of the components or subsystems of processing system 200 may be interconnected by way of one or more buses 214 or other connections.

The bus 214 may be one or more of any type of several bus architectures including a memory bus or memory controller, a peripheral bus, video bus, or the like. The CPU 202 may comprise any type of electronic data processor. The memory 204 may comprise any type of system memory such as static random access memory (SRAM), dynamic random access memory (DRAM), synchronous DRAM (SDRAM), read-only memory (ROM), a combination thereof, or the like. In an embodiment, the memory may include ROM for use at boot-up, and DRAM for program and data storage for use while executing programs.

The mass storage device 206 may comprise any type of storage device configured to store data, programs, and other information and to make the data, programs, and other information accessible via the bus 214. The mass storage device may comprise, for example, one or more of a solid state drive, hard disk drive, a magnetic disk drive, an optical disk drive, or the like.

Video adapter 208 and the I/O interface 210 may be optionally included. They can be used to provide interfaces to couple external input and output devices to the processing system. As illustrated, examples of input and output devices include a display 216, such as an in dash display, coupled to the video adapter 208 and the on screen keyboard/speech interface 218 coupled to the I/O interface 210. It is to be appreciated, however, that these peripherals and other devices are examples only. Other devices may be coupled or connected to the processing system in addition to or in place of those shown and described. Furthermore, additional or fewer interfaces may be utilized. For example, one or more serial interfaces such as an On-Board Diagnostic (ODB) interface (not shown) may be provided.

A communications subsystem 212 may be provided for one or both of transmitting and receiving signals. Communications subsystems may include any component or collection of components for enabling communications over one or more wired and wireless interfaces. These interfaces may include but are not limited to GPRS, UMTS, LTE, LTE-A, dedicated short range communication (DSRC), IEEE 802.11p, WiFi, WiMAX, or Bluetooth™ as well as interfaces defined by the IEEE Intelligent Transportation Systems (ITS) Society for V2V direct communications.

Communication subsystem may include one or more of transmitters 220, receivers 222, and antenna elements 224. In at least some embodiments, the processing system may have geographic positioning functionality, for example to determine a geographic position of the processing system or for receiving timing signals for time synchronization of the system with other systems. The ability to determine geographic positioning is desirable or even required for determining the location, speed, direction or other kinematic information of a vehicle. In at least some embodiments, the processing system may be capable of receiving Global Positioning System (GPS) signals. Therefore in at least one embodiment, as shown in FIG. 2, the processing system may comprise a GPS radio or receiver 226. However, other embodiments may comprise and use other subsystems or components for, for example, determining the geographic position of the processing system or for receiving timing signals for time synchronization.

The processing system 200 of FIG. 2 is merely an example and is not meant to be limiting. Various embodiments may utilize some or all of the components shown or described. Some embodiments may use other components not shown or described but known to persons skilled in the art. Furthermore, a device may contain multiple instances of a component, such as multiple processing system, processors, memories, transmitters, receivers, etc. The processing system may comprise one or more input/output devices, such as a speaker, microphone, touchscreen, keypad, keyboard, display, and the like. Various other options and configurations are contemplated.

As previously mentioned, radio resource sharing and claiming in vehicle to vehicle ad hoc networks (VANET) presents some challenges. One type of approach for resource claiming uses the geographic location of the vehicles. This may be referred to as location based resource sharing.

In location based resource sharing, a road or a segment of a road may be mapped using a grid or virtual grid, which may divide the road into specific geographic areas, which may be referred to as zones. Radio resources may then be allocated among or claimed by vehicles based on the particular zones that the vehicles occupy.

As a vehicle travels along the road, it moves between zones. A vehicle may know or be able to acquire its geographic location and from the location determine which zone it occupies by using its geographic positioning functionality, for example by receiving and processing GPS signals. Since vehicles are moving between zones and resources may be configured on a zone by zone basis, the resources of each zone may need to be made available every so often, for example on a periodic basis. For instance, when a vehicle moves from a first zone to a second zone, the vehicle may need to drop a resource belonging to the first zone and then acquire a resource belonging to the second zone. The vehicle may claim a resource in the second zone at a time when resources of the zone are again made available for claiming.

Figure 3A:
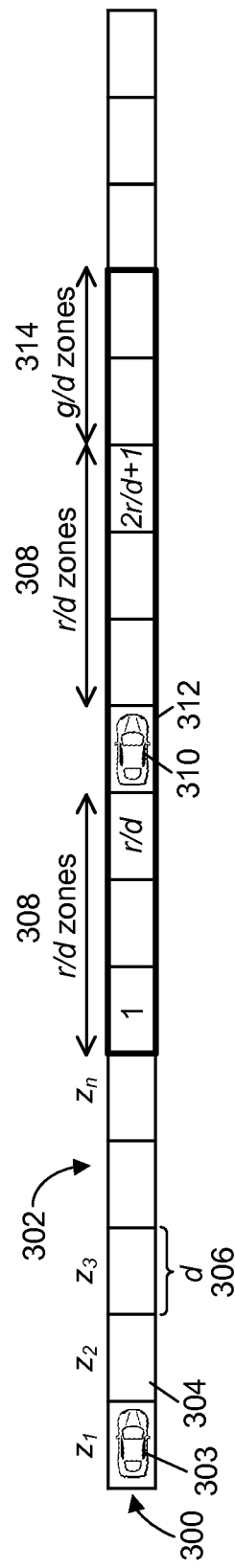
FIG. 3A is a representation of vehicles traveling along a road that has been subdivided into small zones using a virtual grid.
Figure 3B:
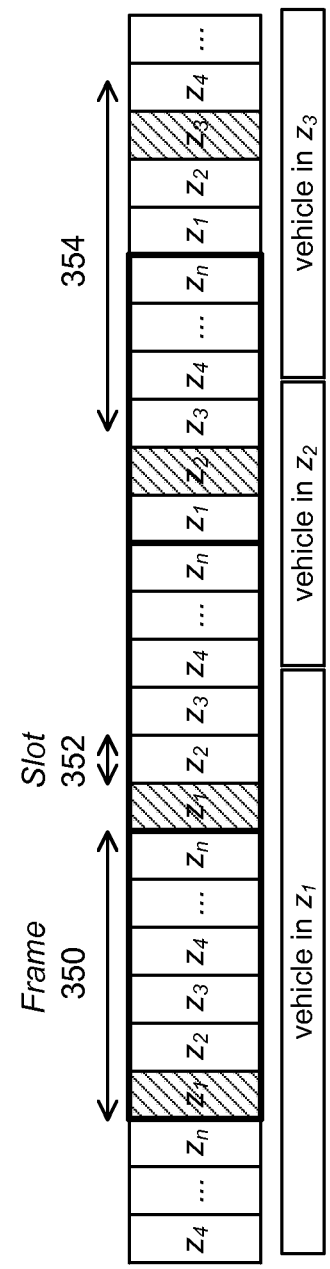
FIG. 3B is a transmission diagram showing multiple frames and associated time slots.

A first existing location based resource sharing approach is shown in FIGS. 3A and 3B. In this approach, a road 300 is mapped using a virtual grid 302 to divide the road into zones 304. For simplicity, only one lane of a road is shown. In this example, a zone has a relatively short length d 306, which may be slightly longer than a length of an average vehicle (e.g. 4 meters, as an example only). Thus based on this zone length, it is assumed that there will be at most one vehicle in a zone at any given time.

The shared radio resources are configured on a per zone basis. The resource may be shared over n adjacent zones, shown in FIG. 3A as zones $z_1, z_2, \ldots, z_n$. For example, with reference to FIG. 3B, in a time division multiple access (TDMA) scheme, one time slot 352 of length $T_s$ within a frame 350 of length $nT_s$ may be pre-assigned per zone, where a frame has n slots. Thus zone $z_1$ may be pre-assigned time slot 1, zone $z_2$ may be pre-assigned time slot 2, etc. This resource assignment configuration is only an example. The relative ordering of zones and the index of time slots may be different. For example, zone $z_1$ may be pre-assigned time slot 2, zone $z_2$ may be pre-assigned time slot 10, zone $z_3$ may be pre-assigned time slot 1, etc. Since it is assumed that there may be a maximum of one vehicle in a zone at a given time, there are no other vehicles in the zone that want to access the radio resource (e.g. at the time slot pre-assigned to the zone). Thus, in theory there will be no contention among vehicles for the single resource pre-assigned to a zone.

The same channels or time slots may be reused for different groups of zones in the grid. For instance, the same channels may be re-used in the next n zones, for example to zone n+1 to zone 2n, and to the following n zones, zone 2n+1 to zone 3n, and so on.

FIG. 3B indicates below the frames 350 the particular zone in which example vehicle 303 (FIG. 3A) is located as time progresses. The time slots (e.g. channels) that are pre-assigned to the specific zone in which vehicle 303 is located are shaded in FIG. 3B. Thus in this approach, each zone has a corresponding time slot in each frame 350.

In addition, as previously mentioned, a vehicle may have an awareness area. A vehicle may receive messages from other vehicles with this area range and therefore may be aware of these other vehicles and receive information from and about them. For example, making reference to FIG. 3A, vehicle 310 may have awareness area range r meters around the vehicle, indicated by reference numeral 308. Since d is the length of a zone, the awareness range may have a length of r/d zones on either side of the zone 312 in which vehicle 310 is located. Thus in this example, the total awareness area is 2d/r+1 zones.

Furthermore, a vehicle may have a guard region of g meters, indicated by reference numeral 314, in front of its awareness area 308. Guard region may have a length of g/d zones and may be used to handle interference at or near the outer region of the awareness area 308. For instance, a guard region may be used to reduce the interference due to periodical channel reuse over the grid. A guard region may also provide extra time to a vehicle to process the relevant received information before it starts listening to the next time frame. In the example of FIG. 3A, vehicle 310 may need to listen to zones 1 to 2r/d+1. Vehicle 310 may ignore zones 2r/d+2 to n.

Where the same channels are reused for different groups of zones in the grid, the awareness range of a vehicle may therefore be equal or less than n/2*d meters (or n/2 zones) ahead and behind of a vehicle. As shown in FIG. 3A, the one-side awareness range of a vehicle is r, the guard range is g, and hence the number of zones, n, within a group of zones that reuses the same channels may be n=(2r+g)/d+1.

This first approach may provide some benefits, for example, there not normally being any contention among vehicles for access to a wireless channel. However, this approach may also have drawbacks. For example, since the length and therefore size of a zone is small, a vehicle must be able to consistently determine its geographic location with a high degree of accuracy. If there is certain amount of error in this determination, a vehicle may incorrectly determine that it is located in a different zone than the zone in which it is actually in, and therefore will attempt to access the channel pre-assigned and belonging to this different zone. As a result, there may be instances where more than one vehicle is simultaneously attempting to use the same resource (e.g. a channel) of a zone.

Furthermore, since the size of each zone is small, in some cases slightly longer than the length of a vehicle, there may be a high likelihood that a majority of zones will be vacant at any given time. Since radio resources are pre-assigned to each zone, there will be a significant amount of wasted resources when many zones are empty.

In addition, there may also be issues with this approach when a vehicle is traveling above a certain speed. A small zone length means that a vehicle may not have enough time to perform processing and transmit over the radio resource when the vehicle is traveling above a certain threshold speed. For example, a maximum delay before starting transmission in a zone may be $(n+1)T_s < d/V_{max}$, indicated with reference numeral 354 in FIG. 3B, where n is the number of slots per frame, $T_s$ is the time duration of a slot, and $V_{max}$ is the maximum speed of a vehicle.

Figure 4A:
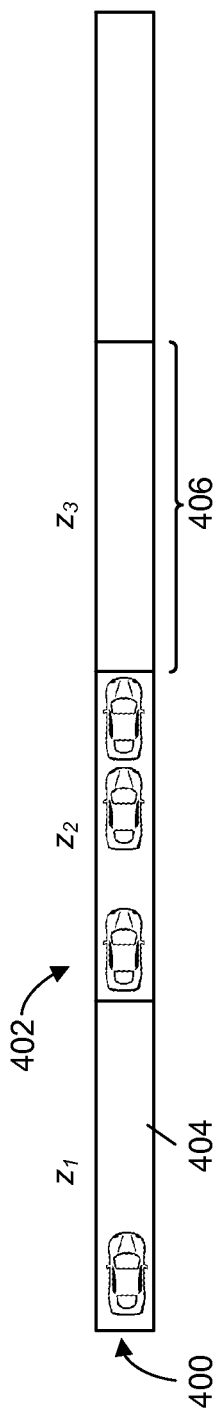
FIG. 4A is a representation of vehicles traveling along a road that has been subdivided into larger zones using a virtual grid.
Figure 4B:
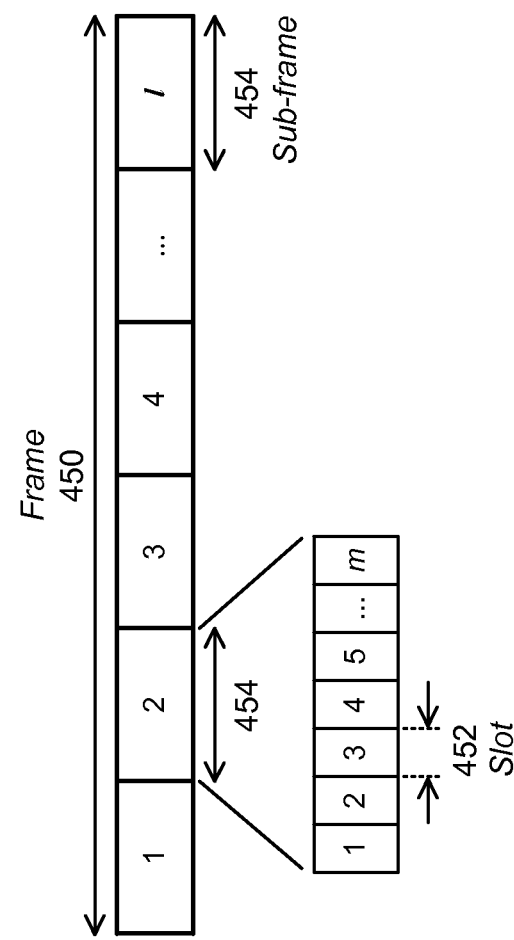
FIG. 4B is a transmission diagram showing a frame and its associated time slots.

A second existing location based resource sharing approach is shown in FIGS. 4A and 4B. This approach is similar to the one shown in FIGS. 3A and 3B, having a road 400, a virtual grid 402, and numerous zones 404. The zones are numbered in FIG. 4A as $z_1, z_2, z_3$, etc. However, in this approach, each zone may have a larger geographic size, for example a longer zone length 406. Therefore one zone may be large enough to contain two or more vehicles at the same time. In addition, in this approach, multiple channels of the resource may be pre-assigned to a single zone. Therefore vehicles in the single zone may use the multiple channels. When there is only one vehicle within the zone, the one vehicle may sense and use several or all of the channels within its zone. When there are two or more vehicles within a zone, there may be contention among the two or more vehicles for access to the channels.

For example, with reference to FIG. 4B, in a time division multiple access (TDMA) implementation, each sub-frame 454 of a frame 450 may be pre-assigned to a different zone. Frame 450 may have 1 sub-frames. For example, sub-frame 1 may be pre-assigned to zone $z_1$, sub-frame 2 pre-assigned to zone $z_2$, etc. In addition, one or more time slots 452 within a sub-frame 454 may be pre-assigned as channels for a given zone. For example, time slots 1 to m in sub-frame 2 may be pre-assigned as channels 1 to m for zone $z_2$.

This second approach differs from the first approach described above in that there may not be a need for such a high degree of accuracy in a vehicle determining its geographic location due to the larger zone sizes. A lower degree of accuracy may be sufficient since the zone size is larger. In other words, the chance that a vehicle is actually in a first zone but incorrectly determines (e.g. using GPS, etc.) that it is in a second zone is lower compared to when a zone is smaller. Furthermore, there may be fewer wasted resources in this second approach since it is likely that fewer zones will be vacant at any given time. In addition, the issue in the first approach that arises when a vehicle exceeds a threshold speed may be lessened or eliminated in the second approach due to longer zone lengths.

However, the issue of channel contention arises in the second approach since channels are shared among vehicles in a single zone. There is therefore a chance of multiple access resource collisions by vehicles attempting to access the same channel. The resource collisions may result in long contention periods for some vehicles, which may translate to high latencies in exchanging information with other vehicles, such as safety related information. In some situations and systems, for example involving the transmission of safety related information, high latencies may be undesirable or even unacceptable.

Therefore according to one aspect present disclosure, one or more approaches are provided for resource access in a vehicular ad hoc network.

According to at least one aspect of the present disclosure, resources may be claimed by vehicles within a given area (e.g. a zone) based on an ordering of the vehicles within the area. The ordering may be based on any suitable criterion or criteria, including information about the one or more vehicles in the area. In at least one embodiment, the ordering may be based on the distance of each vehicle to a reference point or reference location. Therefore claiming of resources may be based on the relative positions (i.e. order) of the vehicles within a zone, not the actual geographic locations of the vehicles. This may be referred to as location ordered resource claiming. Therefore resources may be claimed by vehicles within a zone based on the ordering instead of vehicles randomly selecting a resource for transmission and risking a resource collision with one or more other vehicles. Location ordered resource claiming may reduce or eliminate the possibility of resource collisions that arise in existing resource allocation approaches in vehicular ad hoc networks.

Embodiments of the present disclosure are described with resources in the form of channels. However, the description of "channels" is not meant to be limiting. The present teachings apply to other types of resources.

Since there may be no central entity in an ad hoc network for controlling resource allocation, each vehicle may be responsible for claiming resources for itself and identifying or tracking the claiming or usage of resources by other vehicles, for example other vehicles within its awareness range. In this way, vehicles in the ad hoc network cooperate to share and manage communication resources without a central resource allocating entity. Vehicles may use algorithms, rules, or processes for managing the sharing and claiming of resources in an attempt to reduce or eliminate the chance of two vehicles attempting to claim or use the same resource. For ease of description, the algorithms, set of rules, etc. may be referred to simply as a channel sharing algorithm. In other words, the channel sharing algorithm may enable each vehicle to determine when it may claim and use a resource with little or no risk of a resource collision.

Figure 5A:
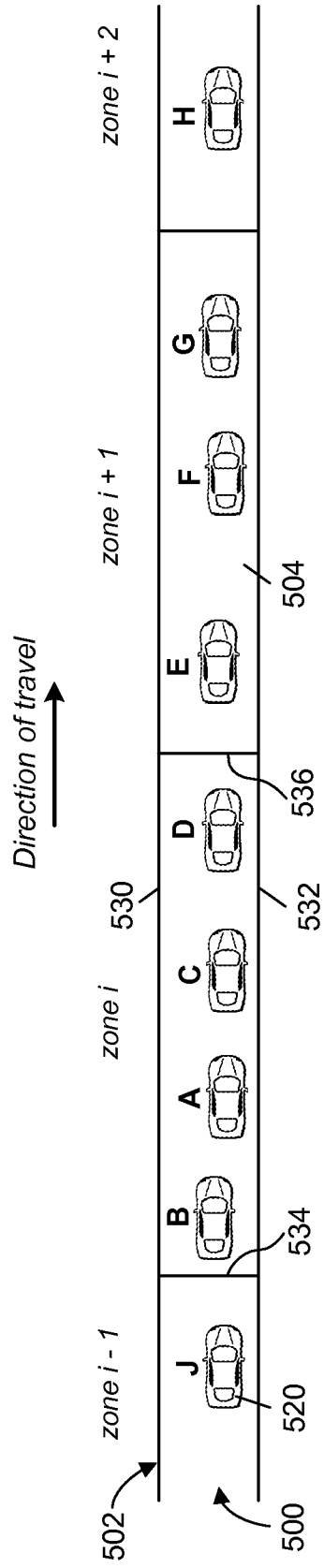
FIG. 5A is a representation of vehicles traveling along a road that has been subdivided into zones using a virtual grid according to at least one embodiment of the present disclosure.

In at least one embodiment, ordering of vehicles may be based on the geographic locations of the vehicles in a zone. FIG. 5A is a representation of multiple vehicles 520 on a road 500 heading in a left to right direction as indicated in the figure. This particular direction of travel is used only for illustrative purposes and is not meant to be limiting. A virtual grid 502 is mapped to road 500 to define a plurality of zones 504. Here, only zones i−1, i, i+1, and i+2 are shown for simplicity.

Figure 5B:
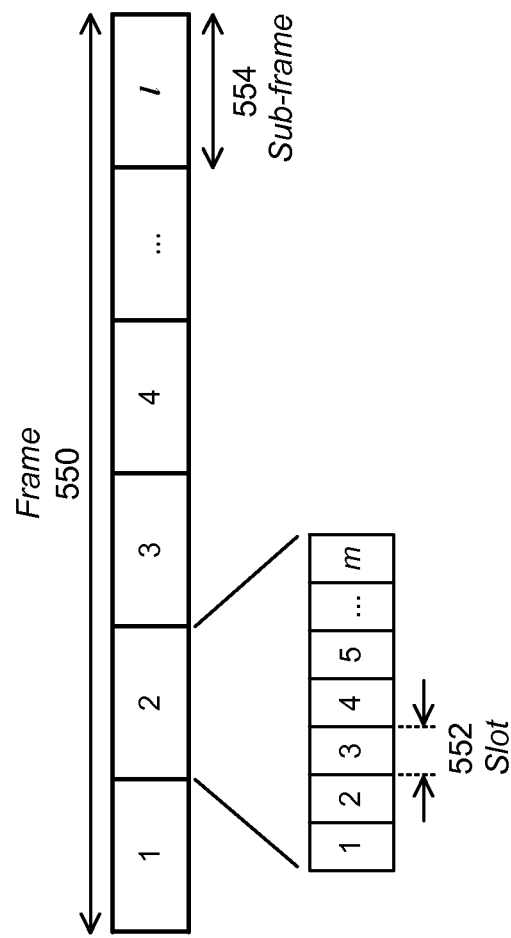
FIG. 5B is a transmission diagram showing a frame and its associated time slots according to at least one embodiment.

FIG. 5B represents a transmission frame 550 having a plurality of sub-frames 554, which may be subdivided into slots 552. Different sub-frames 554 of a frame 550 may be configured or pre-assigned to different zones. For example, sub-frame 1 may be pre-assigned to zone i−1, sub-frame 2 pre-assigned to zone i, sub-frame 3 to zone i+1, etc. Furthermore, one or more time slots 552 within a sub-frame 554 may be pre-assigned as channels in a given zone. For example, time slots 1 to m in sub-frame 2 may be pre-assigned as channels 1 to m for zone i.

Again, in at least one embodiment, since vehicles are moving between zones and channels may be configured on a zone by zone basis, the channels may be made available for claiming by vehicles every so often, for example on a periodic basis. For instance, resource claiming may be performed at times 0, t, 2t, 3t, etc., where t is a duration of a resource claiming cycle. Since there is no centralized resource management in the ad hoc network, each vehicle may claim resources for itself. Since the process and rules for the claiming of resources may be the same for most or all vehicles, the vehicles may claim resources with little or no risk of resource collisions. In at least one embodiment, vehicles may use information known at time t to claim resources at time 2t. Therefore a vehicle may use information about itself, for example its current location (including which zone it is in) as well as similar information that it has received from other vehicles, to claim resources for its use. A vehicle may also be able to identify, based on received information and a channel sharing algorithm common to all vehicles, when particular resources may be claimed and used by other vehicles.

Figure 6A:
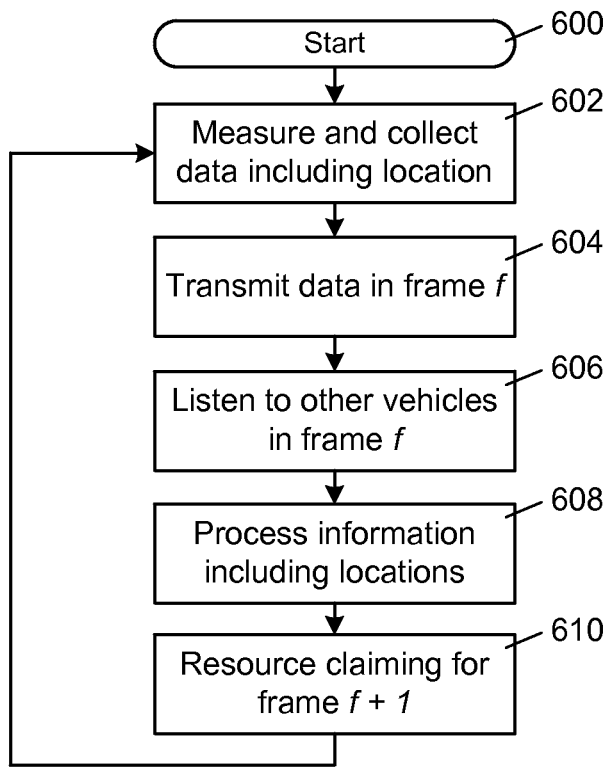
FIG. 6A is a flow diagram of a process for exchanging information and claiming resources at a vehicle in at least one embodiment.

FIG. 6A is a flow diagram showing a process for exchanging information and claiming resources at a vehicle in at least one embodiment. In this embodiment, the process may be performed at all vehicles in the network on a periodic basis. The process begins at block 600 and proceeds to block 602 where the vehicle may measure or collect information and data about itself, including the location of the vehicle. In one embodiment, this may be done using received GPS signals. The process proceeds to block 604 where the vehicle transmits information at time t, such as a beacon message on its claimed resource (e.g. channel, etc.). Time t may be in a transmission frame f. The transmission may include a cooperative awareness message (CAM) or other message, which may include information about the broadcasting vehicle such as its presence, location, kinematics, and other status information. The process proceeds to block 606 where the vehicle listens in frame f for transmissions or broadcasts from other vehicles.

The process proceeds from block 606 to block 608 in which the vehicle may perform one or more tasks, calculations, or other processing, for example processing location and other information, including information received from other vehicles in block 606. The process proceeds to block 610 wherein the vehicle claims a channel for use in time frame f+1. Thus in frame f, a vehicle may claim one or more channels to be used in a subsequent time frame, for example frame f+1.

The process then proceeds back to block 602 and may start over in frame f+1. Thus the transmission by the vehicle at block 604 in frame f+1 may be on the channel (e.g. channel, etc.) that was claimed in frame f.

In at least one embodiment, a process the same as or similar to the process of FIG. 6A may be performed at some or all of the vehicles in the vehicular ad hoc network. The vehicles may be time synchronized in any suitable way. For example, in one embodiment, vehicles may be synchronized using received GPS signals. However, vehicles may be synchronized in other ways.

Furthermore, although in the example of FIG. 6A a vehicle claims resources in every loop of the process, meaning for every frame (e.g. block 610), this is not meant to be limiting. In other embodiments, resources may be claimed at every second frame, or every third frame, or every fourth frame, etc., which may corresponds to every second, third, or fourth, etc. loop of the process of FIG. 6A or a similar process. In other words, in some embodiments, vehicles do not necessarily claim resources in every cycle in which they broadcast a beacon message and listen to broadcasts of other vehicles. It may be sufficient that vehicles perform claim resources on a less frequent basis. This is described with reference to FIG. 6B.

Figure 6B:
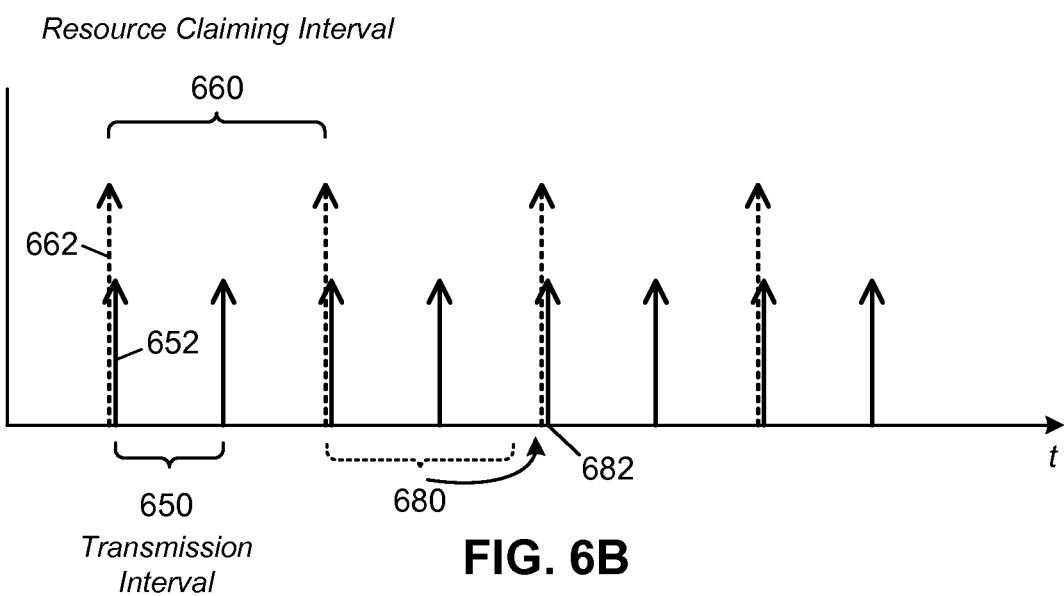
FIG. 6B is timing diagram representing transmission and resource claiming intervals in at least one embodiment.

FIG. 6B is a timing diagram representing transmission and resource claiming intervals in at least one embodiment. The intervals 650 between adjacent short arrows 652 each represent a transmission interval, for example a time frame. Vehicles may transmit or broadcast information to other vehicles in some or all transmission intervals. The intervals 660 between adjacent tall arrows 662 each represent a resource claiming interval. Resource claiming interval 660 may be an integer multiple of a frame duration 650. For example, a vehicle may collect information on channels and other vehicles during one or more transmission intervals 650, the one or more intervals indicated by reference numeral 680. This information may be used by the vehicle in claiming resources at the next resource claim time 682 for one or more subsequent frames.

Again making reference to FIG. 5A, in the following example, we focus on vehicles A, B, C and D in zone i. In the example, each zone is configured with 5 channels. Therefore zone i has channels $c_{i,1}$, $c_{i,2}$, $c_{i,3}$, $c_{i,4}$, and $c_{i,5}$. We also assume that vehicle D has already claimed a channel in zone i, for example channel 1, $c_{i,1}$. Vehicle D may already have claimed a channel, for example because it was in zone i the last time channels were claimed (e.g. frame f−1) and therefore may have maintained its channel, $c_{i,1}$. However, in other embodiments where a vehicle does not maintain its channel even though the vehicle has not changed zones, this vehicle may be included in the group of vehicles that require a channel.

Vehicles A, B and C, on the other hand, do not have channels in zone i and therefore each requires a channel. Vehicles A, B and C may not have channels in zone i for one or more various reasons. For example, one or more of vehicles A, B and C may have moved into zone i from zone i−1 since the last time channels were claimed.

In the above example, one or more of vehicles A, B and C may have just arrived in zone i from zone i−1. Therefore each of these vehicles may currently be using and broadcasting on a channel from zone i−1. However, since they have left zone i−1, they may no longer qualify to use channels in zone i−1 the next time channels are claimed (e.g. frame f). Thus these vehicles may seek to claim channels of zone i at the next resource claiming cycle.

Therefore according to one aspect of the present disclosure, free or available channels in zone i may be claimed by one or more of vehicles A, B and C based on the relative positioning or an ordering of vehicles within the zone. In at least one embodiment, the ordering may be based on the distances of each of the vehicle to at least one reference point or location. The at least one reference point may be any suitable reference point. In at least one embodiment, the reference point or reference location may be an edge of a zone. For example, zones 504 in grid 502 are generally rectangular in shape, although differently shaped zones are possible. Zone i may have first and second zone lateral edges, 530 and 532, as well as first zone end edge 534 and second zone end edge 536. For ease of description, first and second zone end edges 534, 536 may be referred to as left zone edge and right zone edge, respectively.

In at least one embodiment, vehicles may be ordered within a zone based on their distance to an edge of a zone. For example in FIG. 5A, vehicles in zone i that do not have a channel may be ordered based on their distance to right zone edge 536. Ordered in ascending order, the vehicles would be ordered as C, A, and B. Vehicle C is the closest of the three vehicles to the right zone edge 536. Vehicle A is the next closest, and vehicle B is the third closest out of vehicles A, B and C. Assuming that vehicle are traveling from left to right within a zone, such an ordering may prioritize vehicles that entered the zone at an earlier time. It is to be appreciated, however, that vehicles may be ordered in other ways. For example, in one embodiment, vehicles may be ordered based on their distances to left zone edge 534. In another embodiment, vehicles may be ordered based on their distances to some other reference point, either inside or outside of a zone.

In the present example, only one channel is currently claimed in zone i, namely channel $c_{i,1}$ by vehicle D. Therefore there are four free channels available in zone i, namely $c_{i,2}$, $c_{i,3}$, $c_{i,4}$, and $c_{i,5}$. The free channels may be claimed by vehicles A, B and C based on their relative positions to right zone edge 536, as described above. The relative positions of the vehicles may be determined by the distance of each vehicle to right zone edge 536. An example of channel claiming based on this ordering in at least one embodiment is provided below in Table 1.

TABLE 1

Order Based Channel Claiming

| Vehicles Without a Channel in Ascending Order Based on Distance to Right Zone Edge | Free Channel for Claiming by Vehicle |
|---|---|
| C | $c_{i,2}$ |
| A | $c_{i,3}$ |
| B | $c_{i,4}$ |

Vehicle C is the first vehicle in the ordered list of vehicles needing a channel and therefore may be given priority in the channel claiming process. Here, an order based channel claiming algorithm allows vehicle C to determine that it may claim free channel $c_{i,2}$. Using the same algorithm, Vehicle A upon determining its relative position can determine that is the next vehicle in the ordered list, and thus may claim free channel $c_{i,3}$. Vehicle B is the next vehicle and may claim free channel $c_{i,4}$. In such an embodiment, vehicles claim particular channels based on how close they are to an edge of the current zone. For instance, since vehicle C is closest to right zone edge 536, vehicle C is provided the ability to claim the lowest numbered channel. One skilled in the art will appreciate that other ordering rules can be applied including such rules as the vehicles being ordered based on their distance to a mid-point in the zone, or rules that take both vehicle location and velocity into account.

The order or way in which the specific channels are claimed by specific vehicles may be done in any suitable manner. In the above example, the free channels are claimed based on the ascending order of their channel indices, meaning $c_{i,2}$ has the lowest channel index (e.g. 2) and is thus may be claimed by the first vehicle in the ordered list, vehicle C. Channel $c_{i,3}$ (channel 3) has the next lowest channel index and thus may be claimed by the next vehicle in the list, and so on. However, in other embodiments, free channels maybe claimed based on a descending order of the channel indices, or in any other way.

Furthermore, the use of the right zone edge 536 as a reference point for ordering the vehicles requiring a channel is only an example. One or more other reference points may be used in order to come up with an ordering of vehicles within a zone. For example, in one embodiment, vehicles may be ordered in ascending order based on their distance to a left zone edge 534.

In addition, although in the example vehicles are ordered in ascending order based on their distances to right zone edge 536, this is not meant to be limiting. Vehicles may be ordered in any suitable way, including in descending order based on their distance to a zone edge or other reference point.

According to another aspect of the present disclosure, one or more vehicles within a given zone may claim channels from one or more other zones. These may be referred to as secondary channels of a vehicle, while a channel of a zone that is claimed by a vehicle within that zone may be referred to as a primary channel. In some embodiments, a secondary channel, belonging to another zone, can be used by the vehicle to obtain and exchange information with vehicles in another zone. This allows for a greater amount of information to be provided to a vehicle. From the perspective of a given vehicle, the channels can be viewed as primary, secondary, etc. but from the perspective of other vehicles, they may simply be viewed as channels that have been reserved.

In at least some embodiments, the claiming of secondary channels may be based on the relative positions or an ordering of the vehicles within the zone. In some embodiments, the claiming of secondary channels may be similar to the claiming of primary channels described herein.

An example of secondary channel claiming is now described with reference to FIG. 5A.

Although a vehicle in a zone may claim one or more primary channels, the vehicle may also claim one or more secondary channels. In the example, vehicles E, F and G in zone i+1 may have claimed primary channels $c_{i+1,1}$, $c_{i+1,3}$, and $c_{i+1,4}$. Since each zone has five channels in total in the example, zone i+1 therefore has two free channels, namely $c_{i+1,2}$ and $c_{i+1,5}$. In at least one embodiment, one or more such free channels in a zone, here zone i+1, may be claimed by vehicles in a different zone, here zone i.

A vehicle may become aware of one or more free channels of other zones in any suitable way. In at least one embodiment, this information may be included in periodic broadcast messages of other vehicles. For example, a vehicle may receive such information, for instance in frame f, and may then use the information when claiming resources for a future frame, such as frame f+1 or any future frame. In some embodiments, a vehicle may be aware of one or more free channels of other zones, and perhaps even the status of these channels, even without any broadcasting. For instance, the channels that will be free for claiming for frame f+1 may be extracted based on information received at the vehicle at frame f and any handovers of vehicles. Thus broadcast messages indicating free channels may be redundant to vehicles that are able to extract this information from information they may already have. However, such broadcasts may be useful when one or more vehicles are not able to extract this information, for example in the case of a blind vehicle.

The claiming of free channels from other zones may be done in any suitable way. In at least one embodiment, free channels may be claimed in a similar way as primary channels. In the example, free channels $c_{i+1,2}$ and $c_{i+1,5}$ of zone i+1 may be claimed by vehicles A, B, C and D based the relative positions of the vehicles within the zone. For example, the claiming may be based on an ascending ordering of the vehicles, where the ordering may be based on their respective distances to right zone edge 536. Thus the list of vehicles would be ordered D, C, A, and B. It is noted that here all vehicles in zone i may be included in the ordered list, as opposed to only the vehicles that needed a primary channel as described above in one embodiment.

An example illustration of the claiming of secondary channels based on the above described ordering in at least one embodiment is provided below in Table 2.

TABLE 2

Order Based Channel Claiming of Secondary Channels

| Vehicles in Zone i in Ascending Order From Right Zone Edge | Free Channels of Zone i + 1 for Claiming by Vehicles in Zone i |
|---|---|
| D | $c_{i+1,2}$ |
| C | $c_{i+1,5}$ |
| A | — |
| B | — |

Vehicle D is the first vehicle in the ordered list of vehicles and therefore may be given priority in the claiming process for secondary channels. Here, a common channel sharing algorithm implemented at the vehicles determines that vehicle D may claim free channel $c_{i+1,2}$. Vehicle C is the next vehicle in the ordered list, and thus may claim free channel $c_{i+1,5}$. There are no more free channels remaining from zone i+1, therefore vehicles A and B may not claim any secondary channels from this zone.

In this embodiment, a vehicle may claim a secondary channel based on how close it is to an edge of its current zone. The order of vehicles in a zone may represent an order by which the vehicles will likely leave the zone as they drive along a road. For instance, since vehicle D is closest to right zone edge 536, it is likely that vehicle D will leave zone i before vehicles A, B and C. Therefore vehicle D may be given priority in zone i to claim a free channel of zone i+1 as a secondary channel. Vehicle C is the next closest vehicle to right zone edge 536 and therefore claims a secondary channel as well. The claiming of secondary channels in this way gives priority to a vehicle that is likely to be the next vehicle exiting its current zone and therefore will be in a transition situation between zones. In many situations, a secondary channel claimed by a vehicle while in a first zone can then be used as a primary channel for the vehicle when the vehicle moves into a new zone. This is explained below in relation to handovers.

Therefore in this example, secondary channels may be claimed by vehicles, starting with the highest priority vehicle, until no free channels are remaining. In some embodiments, a vehicle may claim two or more secondary channels. However, in at least one embodiment, a vehicle may claim only one secondary channel. Therefore if there are more free secondary channels than there are vehicles in a zone, every vehicle may claim only one secondary channel. The remaining free secondary channels may be left unclaimed or, in some embodiments, may be made available to vehicles in another zone. The latter situation may be described by way of the following example.

With reference to FIG. 5A, vehicle H in zone i+2 may claim or have previously claimed a primary channel, $c_{i+2,1}$. Therefore zone i+2 has four free channels. In embodiments where a vehicle may only claim one secondary channel, a channel sharing algorithm implemented at the vehicles may determine that vehicles G, F, and E may be claim channels $c_{i+2,2}$, $c_{i+2,3}$, and $c_{i+2,4}$, respectively, as secondary channels. Channel $c_{i+2,5}$ may be un-claimed.

In at least one embodiment, one or more of these unclaimed secondary channels may be made available to vehicles in another zone. For example, channel $c_{i+2,5}$ may be made available to vehicles in zone i. Such one or more free channels may be claimed by the vehicle in zone i in any suitable way. In an embodiment where a vehicle may only claim one secondary channel, free channel $c_{i+2,5}$ may be claimed by the highest priority (e.g. ordered) vehicle that has yet to be allocated a secondary channel in an ordered list for the zone. In the present example, channel $c_{i+2,5}$ may be claimed by vehicle A as shown below in Table 3.

TABLE 3

Order Based Channel Claiming of Secondary Channels

| Vehicles in Zone i in Ascending Order From Right Zone Edge | Free Channels of Zone i + 1 for Claiming by Vehicles in Zone i |
| --- | --- |
| D | $c_{i+1,2}$ |
| C | $c_{i+1,5}$ |
| A | $c_{i+2,5}$ |
| B | — |

In another embodiment where a vehicle may claim two or more secondary channels, free channel $c_{i+2,5}$ in the above example may be claimed by the highest priority in a zone, for example the highest priority vehicle in an ordered list of all vehicles in the zone. In the example, channel $c_{i+2,5}$ may therefore be claimed by vehicle D rather than vehicle A.

However, in other embodiments, one or more channels such as channel $c_{i+2,5}$ may be claimed in a different way to a vehicle in zone i, or may even be claimed by a vehicle in a different zone. For example, in a different situation (not shown) where all vehicles in zone i have already claimed secondary channels, channel $c_{i+2,5}$ may be made available to vehicles in zone i−1. In one embodiment, a vehicle may be able to claim a secondary channel from any zone within its awareness range. Other options are possible.

In at least some embodiments, a vehicle may identify or learn of secondary channels claimed by other vehicles in some or all other zones within its awareness range. An example illustrates how this may be accomplished in one embodiment. A vehicle is in zone i and may claim a free channel from zone i+2. To do so, the vehicle may need to know a current list of free channels in zone i+2. As previously described, priority for one or more free channels in zone i+2 may be given to vehicles in zone i+1 before any vehicles in zone i. Therefore the vehicle in zone i is interested to know a list of free channels of zone i+2, if any, that remain after the free channels of zone i+2 have been claimed by any vehicles in zone i+1. If there are any free channels of zone i+2 remaining, they may be claimed by vehicles in zone i. Therefore in at least one embodiment, the vehicle in zone i identifies or learns of secondary channels claimed by other vehicles in other zones, here for example for zone i+1 in order to have a correct list of free channels for claiming a secondary channel in zone i.

In the above example embodiments, vehicles in a given zone (e.g. zone i) are described as claiming secondary channels from zones "in front" of (e.g. zone i+1, i+2, etc.) their zone. However, this is not meant to be limiting. A vehicle may claim a secondary channel from any other zone or zones, for example from a zone "behind" (e.g. zone i−1, i−2, etc.) the zone of vehicle.

The claiming of resources by vehicles in a given zone based on an ordering of the vehicles within the zone, or relative positioning of the vehicles with respect to a zone boundary, may provide advantages over other resource sharing or access schemes. Again, in at least some embodiments, the resource claiming is based on the relative positions (e.g. order) of the vehicles within a zone, not the actual geographic locations of the vehicles. Using an ordering of vehicles may reduce or eliminate the sensitivity of some embodiments to location measurement error of the vehicles. An example of a location measurement error is the error in a GPS determined geographic location. Therefore in at least some embodiments of the present disclosure, even large location measurement errors may not have a significant or even minor impact on resource claiming performance. For example, if a vehicle incorrectly determines its location to be 20 meters away from its actual location, the vehicle broadcasts this inaccurate information to neighboring vehicles. Neighboring is used herein to mean vehicles within a range of another vehicle, for example an awareness range. Although the vehicle has inaccurately determined its location, all vehicles in the neighborhood will use the same inaccurate location and will arrive at the same ordering of vehicles. Therefore the inaccurate location information will not necessarily increase the chance of a resource collision.

According to another aspect of the present disclosure, one or more approaches are provided for handling resource handover situations in a vehicular ad hoc network. The term resource handover relates to how resources claimed by a vehicle are handled when the vehicle moves between zones.

A vehicle may remain in the same zone for several resource claiming cycles. In some embodiments, the vehicle may retain its primary channel, and may even retain its secondary channel, while it remains in the same zone. However in some embodiments, secondary channels may be released and made available for claiming at some or every resource claiming cycle even though a vehicle remains in the same zone.

When a vehicle changes zones, however, a primary channel of the vehicle may be dropped and a new primary channel in the new zone may be acquired. Some different possibilities and situations of at least some embodiments are now described.

Figure 7A:
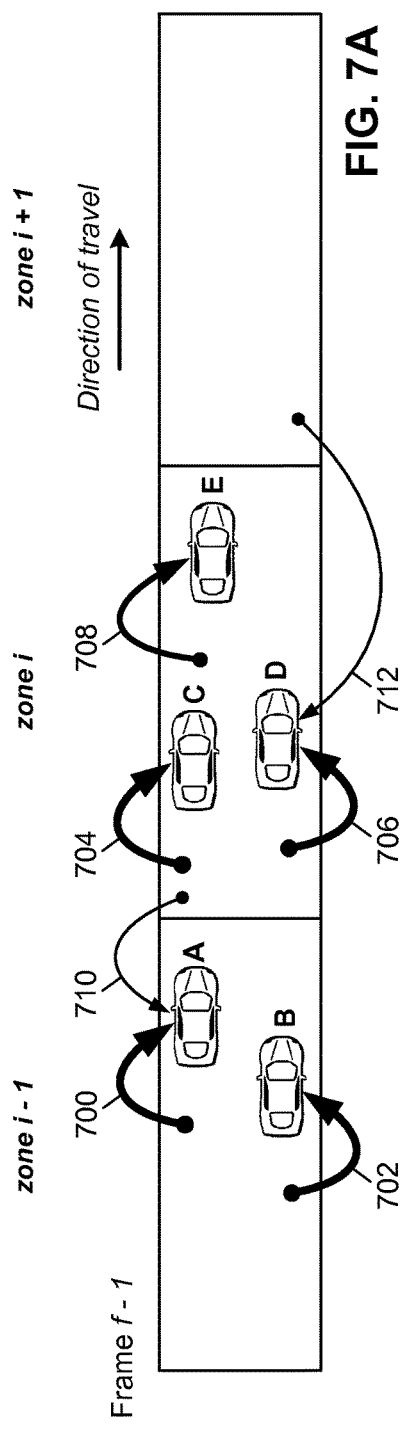
FIGS. 7A through 7C are representations of vehicles traveling along a road that has been subdivided into zones in handover situations according to at least one embodiment.
Figure 7B:
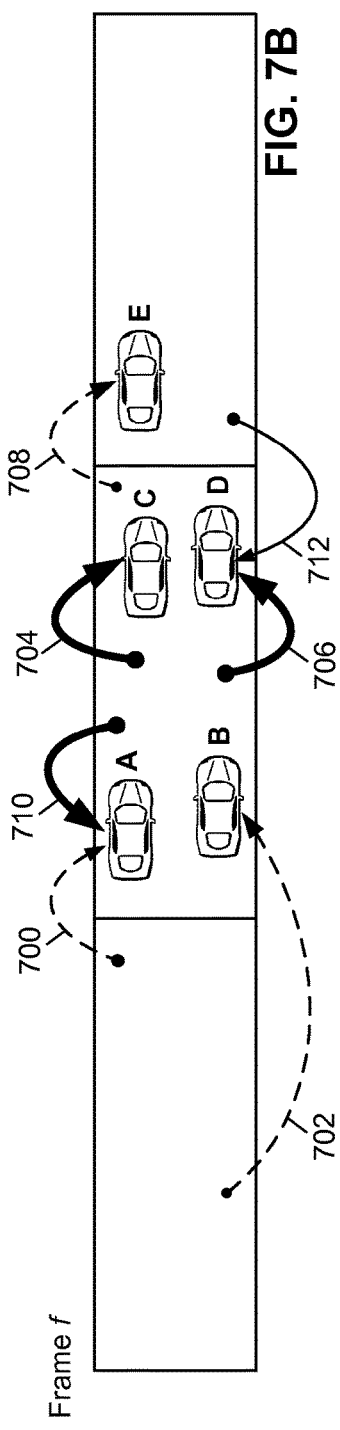
Figure 7C:
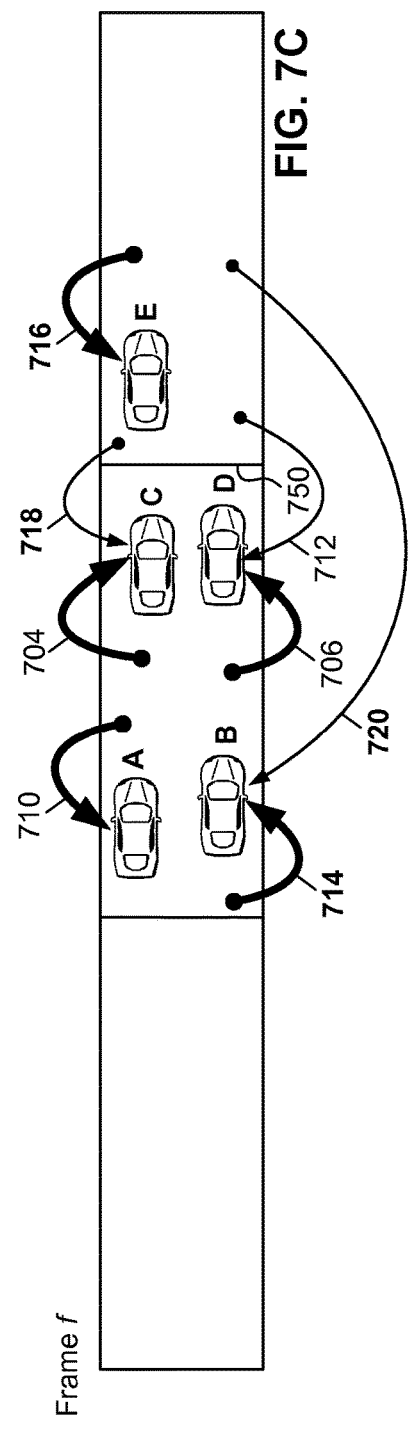

Reference is made to FIGS. 7A, 7B, and 7C, which each show three adjacent zones, i−1, i, and i+1 in a virtual grid.

FIG. 7A shows resource claiming at frame f−1 for transmissions to be made at frame f for vehicles A through E. FIG. 7B shows the statuses of various channels when transmissions occur at frame f. Vehicles A and B have moved from zone i−1 to zone i, and vehicle E has moved from zone i to zone i+1. FIG. 7C shows resource claiming at frame f for transmissions to be made by the vehicles at frame f+1.

As indicated by the thickest curved arrows in FIG. 7A, at frame f, each of vehicles A through E has a primary channel, namely 700, 702, 704, 706 and 708. In addition, vehicle A has a secondary channel 710 from zone i, and vehicle D has a secondary channel 712 from zone i+1.

As shown in FIG. 7B, when vehicles A, B and E move between zones, their primary channels 700, 702 and 708 change statuses to become temporary channels, indicated by the broken line arrows. Vehicles A, B and E may still use their primary channels to broadcast during frame f. In addition, the status of secondary channel 710 of vehicle A changes from being a secondary channel to a primary channel, as indicated by the thick arrow line 710 in FIG. 7B. Since this channel belongs to zone i, it may become a primary channel of vehicle A.

FIG. 7C shows resource claiming for the vehicles at frame f for transmissions to be made at frame f+1. Temporary channels 700, 702 and 708 of vehicles A, B and E, respectively, shown in FIG. 7B are dropped as they were previously claimed as primary channels when the vehicles were in other zones. Vehicles A, C, and D may retain their primary channels, 710, 704, and 706, respectively. After moving to new zones, as shown in FIG. 7B, vehicles B and E are without primary channels. Therefore vehicles B and E may claim primary channels 714 and 716, respectively, for frame f+1 as shown in FIG. 7C. Channels 714 and 716 belong to the respective zones of vehicles B and E, namely zones i and i+1. Primary channel 714 may be claimed in any suitable way, including based on an ordering of vehicles in zone i based on the relative locations of the vehicles as previously described. Primary channel 716 may be claimed in a similar manner from among channels of zone i+1.

Furthermore, vehicles may also claim one or more secondary channels. For example, vehicles C and B claim secondary channels 718 and 720, respectively, for frame f+1, as shown in FIG. 7C. These secondary channels may also be claimed in any suitable way, including based on an ordering of vehicles in zone i, for example based on the relative locations of the vehicles. For example, vehicles B and C may be ordered based on closeness to right zone edge 750 of zone i. In such a case, the order would be: C then B. Accordingly, in at least one embodiment, vehicle C would have priority over vehicle B in the claiming of free channels from zone i+1 as secondary channels.

Figure 8:
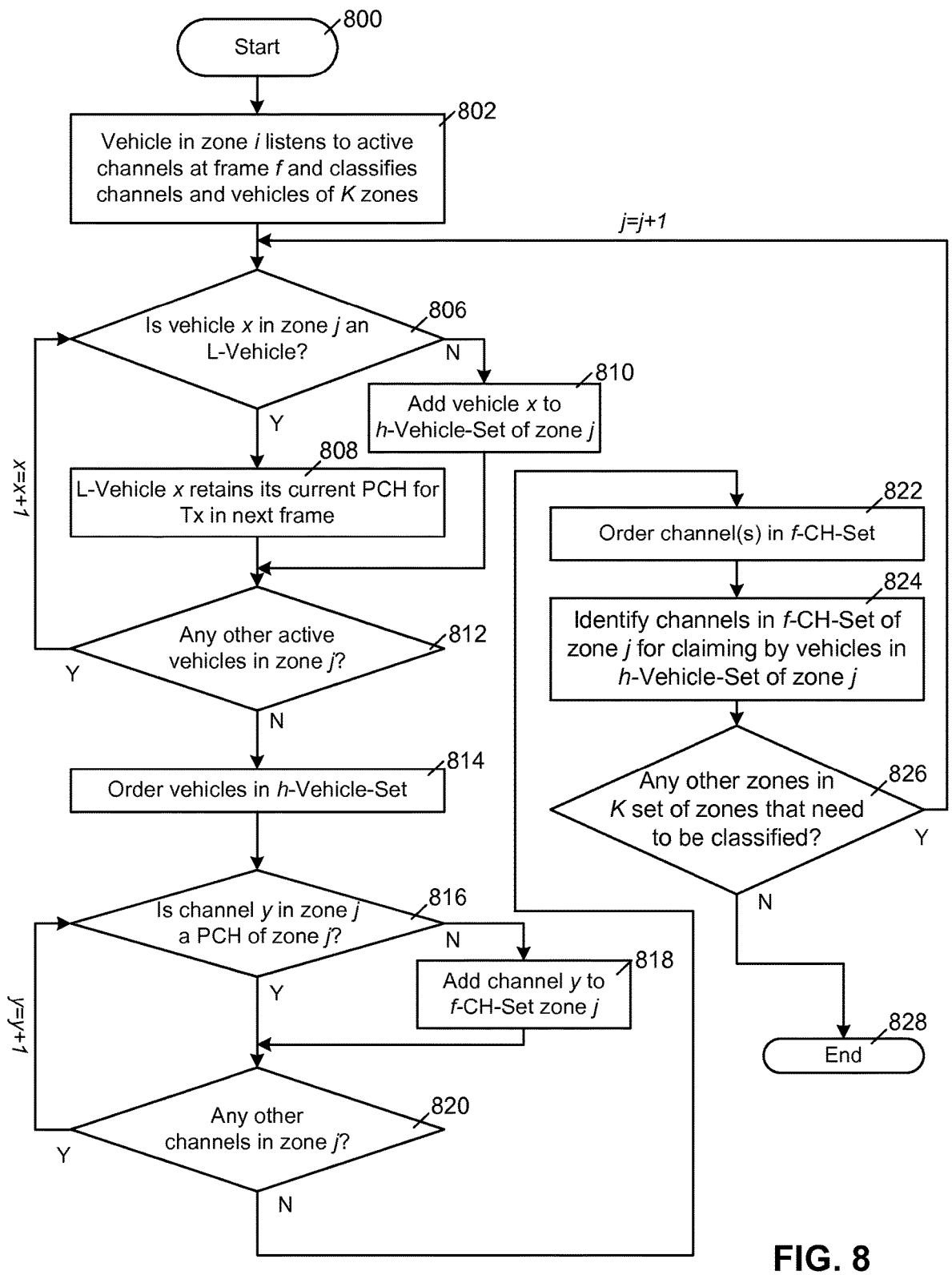
FIG. 8 is a flow diagram of a process for handling handover situations according to at least one embodiment.

FIG. 8 is a flow diagram showing a process for handling handover situations according to at least one embodiment of the present disclosure. Handover processing may be performed at all vehicles in a vehicular ad hoc network. In this way, each of the vehicles may be able to track the release and claiming of one or more channels as a result of a vehicle moving from one zone to another zone.

The process begins at block 800 and proceeds to block 802 where a vehicle located in zone i listens to active channels at frame f. These channels may belong to K different zones, for example zones within the awareness range of the vehicle. The vehicle may classify channels on a zone by zone basis, where a zone being considered is referred to as the "$j^{th}$" zone. In one embodiment, the vehicle may classify the channel(s) of the $j^{th}$ zone of the K zones at frame f for transmission at frame f+1 according to Table 4 below.

TABLE 4

Channel Classification

| | Listening at Frame f | | | |
|---|---|---|---|---|
| Handover type | Receiving data belongs to a vehicle in zone | Carrying channel of the received data belongs to zone | Channel mode at frame f when actual Tx happened | Channel classification for frame f + 1 |
| N/A | i | i | PCH | PCH |
| N/A | i | i < q ≤ i + U | SCH | f-CH |
| Incoming | i | i − 1 | I-TCH | f-CH |
| Outgoing | i + 1 | i | O-TCH | f-CH |

In Table 4, a PCH is a primary channel, meaning a channel that is used by a vehicle in the same zone. A SCH is a secondary channel, meaning a channel of a first zone that is used by a vehicle in another (e.g. previous) zone. In this example, every secondary channel (SCH) is released (e.g. becomes a free channel) and made available for the next resource claiming cycle. However, as mentioned before, in other embodiments, a secondary channel (SCH) may remain claimed by a vehicle for more than one resource claiming cycle. Zones i+1 to i+U are zones in front of zone i and are assumed to be within the awareness range of the vehicle. Zone q is therefore a zone in the range of zones i+1 to i+U. It is also assumed that the vehicle in zone i may potentially claim one or more channels as secondary channels from one or more of zones i+1 to zone i+U.

A TCH is a temporary channel. I-TCH refers to an incoming temporary channel, where O-TCH refers to an outgoing temporary channel. A temporary channel is a channel that is used by a vehicle arriving in a new zone where the channel belongs to the zone that the vehicle has just departed (e.g. previous zone). Therefore from the new zone point of view, the temporary channel is an incoming temporary channel (I-TCH). From the previous zone point of view, the channel is an outgoing temporary channel (O-TCH). A TCH may be immediately released for claiming in the next resource claiming cycle. However, in other embodiments, a TCH may be retained by a vehicle in certain situations, for example if the vehicle is unable to find a new primary channel (PCH). This may occur for any reason, such as if the vehicle is blind or in a handover situation when the vehicle moves into a different zone. An f-CH is a free channel, meaning a channel which is assumed to be free for claiming in the next frame (e.g. frame f=f+1).

In a similar way, the vehicle may classify other vehicles on a zone by zone basis, again where a zone being considered is referred to as the "$j^{th}$" zone. Thus in at least one embodiment, the vehicle located in zone j listening to active channels at frame f may classify vehicles according to Table 5 below.

TABLE 5

Vehicle Classification

| A Heard Vehicle is Located in Zone | This Vehicle Used This Channel Type(s) at Frame f When Actual Tx Happened | Vehicle Classification for Frame f + 1 |
|---|---|---|
| i | PCH only or a combination of PCH and other channel types | L-Vehicle |
| i | I-TCH only | I-Vehicle |
| i + 1 | O-TCH only or in combination with other channel types | O-Vehicle |

In Table 5, An L-Vehicle is a local vehicle, meaning a vehicle with a primary channel (PCH) when it is heard. An I-Vehicle is an incoming vehicle, meaning a handover vehicle recently arrived in a zone and it does not yet have a PCH channel. An O-Vehicle is an outgoing vehicle, meaning a handover vehicle that has recently left a zone while having an outgoing temporary channel (O-TCH). An h-Vehicle is a handover vehicle. From a zone perspective, a handover vehicle is either an I-Vehicle or O-Vehicle.

Again making reference to FIG. 8, the process proceeds from block 802 to block 806 where one or more vehicles of zone j may be classified. In at least one embodiment, the vehicles of zone j may be considered one at a time. In particular, a vehicle being classified may be referred to as the $x^{th}$ vehicle of zone j. Thus at block 806, it may be determined whether the $x^{th}$ vehicle of zone j is a local vehicle (L-Vehicle). If the $x^{th}$ vehicle is an L-Vehicle of zone j, the process proceeds to block 808, where $x^{th}$ vehicle is assumed to retain its current primary channel (PCH) for transmission in frame f+1. However, if the $x^{th}$ vehicle is not an L-Vehicle of zone j, the process proceeds to block 810, where the $x^{th}$ vehicle is added to a handover vehicle set (h-Vehicle-Set) of zone j.

From both blocks 808 and 810, the process proceeds to block 812 where it is determined if there are any other vehicles in zone j (e.g. any other vehicles that have not yet been classified). If there is at least one other active vehicle in zone j, the process proceeds back to block 806 and a next vehicle (x+1$^{th}$ vehicle) is considered. However, if there are no other active vehicles, the process proceeds to block 814, where the vehicle(s) in the h-Vehicle-Set for zone j may be ordered in any suitable way. The vehicles may be ordered based on their relative positions to one another. For example, the vehicles may be ordered in ascending order based on their distances to a right zone edge of zone j, as previously described. Here, we assume vehicles are traveling in zones from left to right, for illustrative purposes. However, vehicles in h-Vehicle-Set may be ordered in any other suitable way.

The process proceeds from block 814 to block 816, where it is determined if the $y^{th}$ channel of zone j is a primary channel (PCH) of zone j. If the $y^{th}$ channel is a primary channel, the process proceeds to block 820. If the $y^{th}$ channel is not a primary channel, the process proceeds to block 818, where the channel is added to a free channel set (f-CH-Set) of zone j.

The process then proceeds from block 818 to block 820, where it is determined if there are any other channels in zone j that are to be classified. If there is at least one more channel in zone j (e.g. any channels are still to be classified), the process proceeds back to block 816 and a next channel (y+1th vehicle) is considered. When there are no further channels, the process proceeds from block 820 to block 822, where channels in the f-CH-Set may be ordered. The channels may be ordered in ascending or descending order based on their channel indices, as previously described. However, channels in f-CH-Set may be ordered in any other suitable way.

The process proceeds from block 822 to block 824, where a vehicle performing the process of FIG. 8 may identify free channels in f-CH-Set of zone j that are claimed as primary channels by vehicles in h-Vehicle-Set of zone j. Again, a vehicle identifying how free channels are claimed by other vehicles may do so using information relating to the other vehicles and a common channel sharing algorithm. Thus a vehicle may be able to deduce the claiming of channels by other vehicles without receiving any indications about the claiming from the other vehicles. Although in some instances not all channels in the set of free channels f-CH-Set of zone j may be claimed as primary channels by vehicles in zone j, these channels may be claimed as secondary channels by vehicles in other zones, and the identification of free channels is important in the avoidance of resource collisions.

The way in which channels are claimed by vehicles may be done in any suitable way, including the ways described herein of claiming primary channels based on a list of vehicles in a zone ordered based on their relative positions within a zone. For example, a vehicle at the top of the ordered list of vehicles may be given priority and therefore may claim the first channel from the ordered f-CH-Set. The vehicle and channel may be removed from the h-Vehicle-Set and f-CH-Set, respectively. The channel claiming may then continue in the same manner, with the first vehicle at the top of the ordered list of vehicles being given priority and therefore claiming the channel at the top of the ordered f-CH-Set. In at least one embodiment, this channel claiming process may be done iteratively, where a vehicle in h-Vehicle-Set claims a channel from f-CH-Set, and then both the vehicle and the channel are removed from their respective h-Vehicle-Set and f-CH-Set. Then a next vehicle in h-Vehicle-Set claims a channel from among the channels remaining in f-CH-Set. However, in other embodiments, the channel claiming need not be performed iteratively.

The procedure of identifying channels claimed by other vehicles at block 824 may continue, for example, until all vehicles in the h-Vehicle-Set have claimed a channel or all free channels in f-CH-Set have been claimed. The process may then proceed to block 826, where it is determined if there are any other zones in the K set of zones to be classified. If there is at least one more zone, the process may return to block 806. However, if there are no further zones to classify, the process may proceed to block 828 and end.

Although the embodiment of FIG. 8 shows a particular number and order of steps in the process, this is not meant to be limiting. For example, the order of steps may be different in other embodiments. Also, in some embodiments, some steps may be performed in parallel rather than serially. For example, classifying all of the vehicles and all of the channels of a given zone may be done in parallel. Other options are possible.

Figure 9:
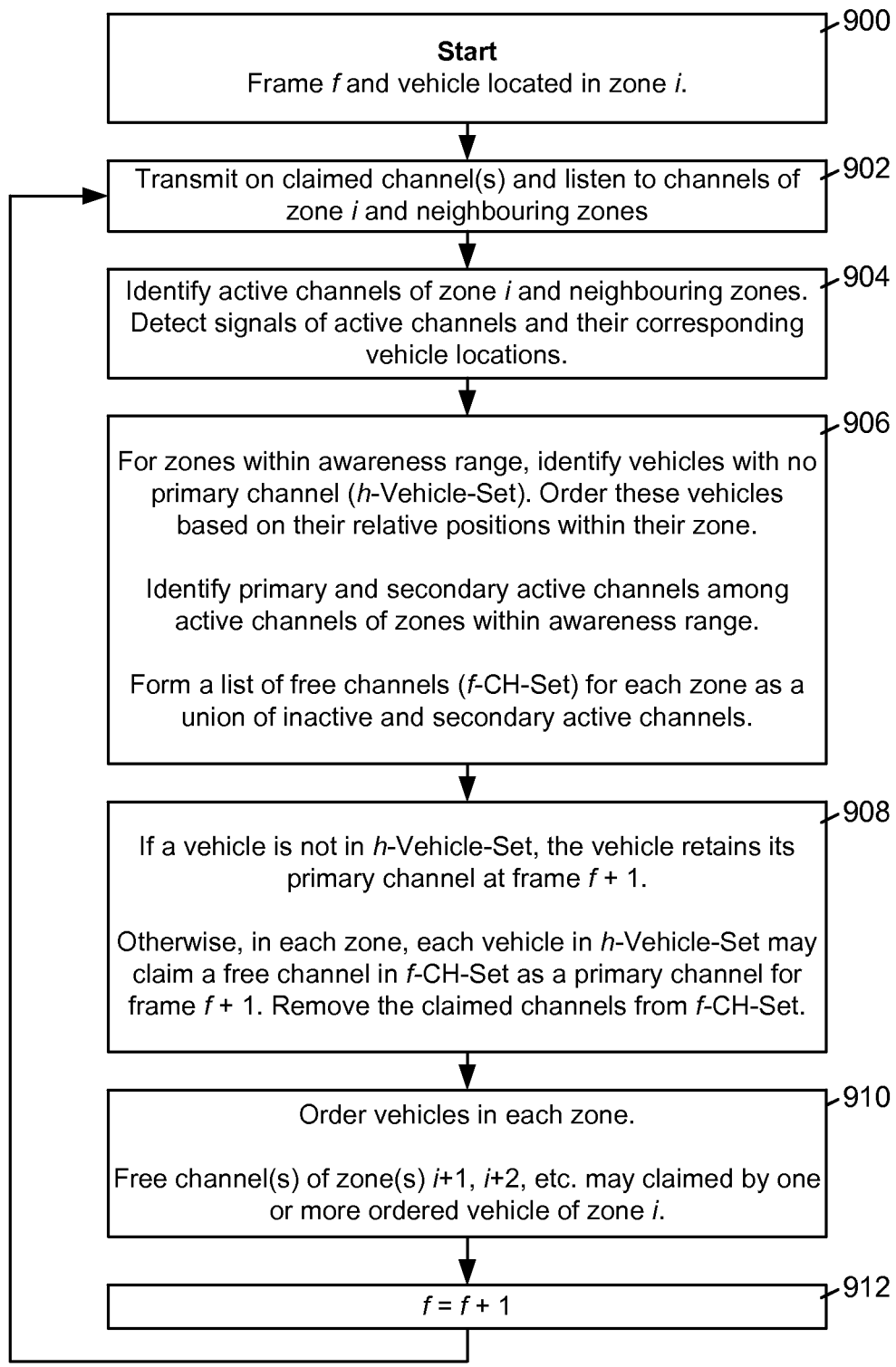
FIG. 9 is a flow diagram of a process for location ordered resource claiming at a vehicle according to at least one embodiment.

FIG. 9 is a flow diagram showing a general process for location ordered resource claiming at a vehicle in a vehicular ad hoc network according to at least one embodiment of the present disclosure. The process includes primary and secondary channel claiming as well as handover handling. A vehicle may claim one or more free channels for itself. In addition, a vehicle may identify free channels that may be claimed by other vehicles within its awareness range based on the locations of other vehicles. Therefore a vehicle may use its own location as well as locations and possibly other information received from other vehicles to possibly claim a channel for itself and to identify other channels claimed by other vehicles. Because each vehicle acquires the same or similar information about other vehicles and because each vehicle implements a common channel sharing algorithm, the vehicles may cooperate to share channels with a low probability of resource collisions.

In at least some embodiments, some of the steps in the process of FIG. 9 may be related to one or more steps in the process of FIG. 8, including the identification and classification of vehicles and channels in one or more zones in the awareness range of the vehicle performing the steps.

The process begins at block 900, where the vehicle is located in zone i and the time is time frame f. One skilled in the art will appreciate that reference to time frame f can be understood to be reference to a time window in which a particular data frame is transmitted. The window can be larger than the transmission time of a single frame, but is generally not smaller. The process proceeds to block 902, where the vehicle may transmit on its one or more claimed channels, and may also listen on other channels of zone i as well as on one or more channels of other zones.

The process proceeds from block 902 to block 904, where active channels of zone i and other neighboring zones may be identified. The locations of vehicles transmitting on these active channels may also be determined. In some embodiments, a vehicle may already know which channels are active in the current transmission interval, based on knowledge obtained in a previous transmission interval. Because a node may know where other nodes are and the channels that they use, it may be possible to determine, to a very high likelihood, which channels have been reserved. Such a determination can be used to avoid explicitly identifying active channels. However, in other situations, a vehicle may not have sufficient information to know the active status of some or all channels. In such a case, the vehicle may be at least partly "blind". In such a situation or where a vehicle otherwise needs to enter the network, the vehicle may independently identify active channels through an activity detection process.

The process then proceeds to block 906, where, for some or all zones within the awareness range of the vehicle, both vehicles without a primary channel and free channels are identified. In particular, all vehicles participating in the V2V network that are within a given zone and do not have primary channels may be added to an h-Vehicle-Set of that zone. The vehicles in the h-Vehicle-Set may then be ordered in any suitable way, for example based on their relative positions within the zone as previously described. In addition, primary and secondary channels among active channels within each zone of the zones within the awareness range may be identified. A set of free channels (f-CH-Set) is determined for each zone of the zones within the awareness range as a union of inactive and secondary active channels of the particular zone. In at least one embodiment, the channels in an f-CH-Set may be ordered in any suitable way, for example in ascending order based on channel indices. In some embodiments of the method, legacy vehicles that are not a part of the V2V network are excluded from assignment to the h-Vehicle set.

The process proceeds from block 906 to block 908, where primary channels are claimed. In block 908 of FIG. 9, for each zone within the awareness range, vehicles of the particular zone that are not in the h-Vehicle-Set of the zone may retain their primary channel (PCH) for transmissions at frame f+1. On the other hand, vehicles within the h-Vehicle-Set of the zone may claim a channel of the zone as a primary channel. The ordering of vehicles in h-Vehicle-Set may be used to prioritize the claiming of primary channels, as previously described. For example, the first vehicle in an ordered h-Vehicle-Set may be given priority to claim a free channel from f-CH-Set. A second vehicle in the ordered h-Vehicle-Set may be given second priority to claim a free channel in f-CH-Set, and so on. Vehicles may be able to identify free channels claimed as primary channels by other vehicles using information about the other vehicles (e.g. their locations, etc.) and a channel sharing algorithm (e.g. relative vehicle positions in a zone). In some embodiments, this channel claiming process may be similar to the previously described primary claiming process of block 824 of FIG. 8. Therefore the description of block 824 will not be fully repeated here.

The process proceeds from block 908 to block 910, where secondary channels may be claimed by vehicles, when available. Vehicles may be able to identify free channels claimed as secondary channels by other vehicles using information about the other vehicles (e.g. their locations, etc.) and a channel sharing algorithm (e.g. relative vehicle positions in a zone). Secondary channels may be claimed in any suitable way, including the ways described herein. For example, the vehicles within a zone may be ordered and then secondary channels may be claimed by one or more of the vehicles based on the ordering. In at least one embodiment, a vehicle may claim at most one secondary channel at a time. However, in other embodiments, a vehicle may claim multiple secondary channels. Multiple secondary channels may belong to the same zone or to two or more different zones.

The process proceeds from block 910 to block 912, where frame f is incremented, for example f=f+1.

The process proceeds from block 912 to block 902, where the process may restart.

According to another aspect of the present disclosure, one or more approaches are provided for enabling the recovery of blind vehicles When a vehicle fails to receive sufficient information to enable it to perform necessary functions, for example resource claiming for an upcoming frame (e.g. frame f+1, etc.), the vehicle lacks information and thus is at least partially "blind". The vehicle therefore does not have a complete picture of its surroundings. A vehicle may not have sufficient information for one or more reasons, including that the vehicle did not successfully receive or decode information from one or more other vehicles. As a result, the vehicle may not know on which channel(s) to broadcast in an upcoming frame. The vehicle may also not know the locations of some vehicles or the claiming of channels by some vehicles.

A blind vehicle may have a primary channel but may not have enough information to determine whether there are one or more free channels in zone i+1 (or one or more other zones, such as zone i+2, i+3, etc.) available for use as a secondary channel. Vehicle recovery refers to a process of providing a blind vehicle with information about channel usage in one or more other zones. For example, a blind vehicle in zone i may be made aware of channel usage information for one or more of zones i+1, i+2, i+3, etc.

On the other hand, a vehicle that does not have a primary channel is considered to be "new" and thus in at least some embodiments may need to go through a network entry procedure in order to claim or be assigned a primary channel.

Figure 10:
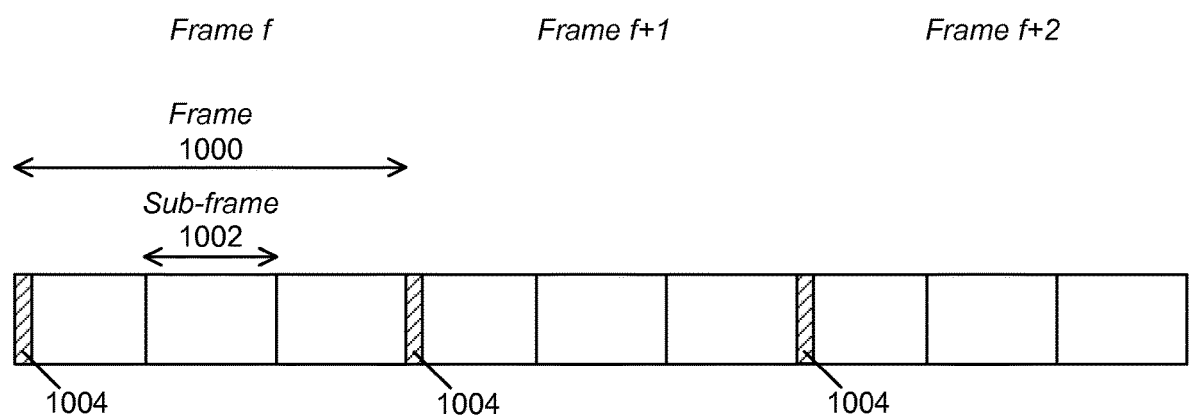
FIG. 10 is a transmission diagram showing frames and associated time slots in a blind node recovery situation according to at least one embodiment.

Blind vehicle recovery may be provided in a number of different situations. For example, blind vehicle recovery may be provided for a non-handover blind vehicle. A non-handover vehicle is a vehicle that has not moved into a new zone in the current frame. In at least one embodiment for handling blind vehicle recovery, one or more time frames may comprise a broadcast channel. FIG. 10 shows a number of frames 1000 in an embodiment having such a broadcast channel 1004 in a first sub-frame 1002 of one or more frames 1000. Broadcast channel 1004 may contain information indicating one or more free channels in a given zone (e.g. zone i+1) to vehicles, such as a blind vehicle, in a neighboring zone (e.g. zone i). Broadcast channel 1004 may be located at or near the beginning of frame 1000, as shown in FIG. 10, or in any other position within a frame.

A broadcast channel 1004 may be configured by predefining specific radio resources, for example including but not limited to predefined sparse code multiple access (SCMA) resources such as SCMA layers.

The broadcasting on broadcast channel 1004 of a zone (e.g. zone i+1) may be performed by a vehicle in the zone. In at least one embodiment, a vehicle in the zone may serve as a master vehicle to broadcast on channel 1004 of the zone. A vehicle may become a master vehicle in any suitable way. For example, in one embodiment, one or more vehicles may become masters autonomously based on their relative positioning in the zone. For example, in at least some embodiments, one or more vehicles that are physically closest to a reference location in a zone, such as a zone edge, may take on the role of master. In some embodiments, one or more vehicles may become masters in this manner so that, for example, the vehicle(s) in zone i+1 being closest to the left zone edge of zone i+1 will be the closest vehicle(s) to blind vehicles in zone i. However, other ways that one or more vehicles may become master vehicles are contemplated.

Therefore one or more blind vehicles in zone i may listen to a broadcast channel of one or more other zones (e.g. zone i+1) to identify any free channels of the one or more other zones (e.g. zone i+1) that may be used as secondary channels by the blind nodes in zone i. In this way, a blind vehicle receives information on free channels in other zones (e.g. channels, locations, etc.) that it was previously missing. The new information may then allow the vehicle to possibly claim one or more secondary channels.

In addition, in at least one embodiment, joint transmission of broadcast information on broadcast channel 1004 may be enabled by having multiple master vehicles. Joint transmission may be implemented using co-ordination between the master vehicles in a zone. Typically the master vehicles are non-blind nodes.

Furthermore, the broadcast channels of different zones within a given range may occupy different radio resources in order to reduce interference between them.

In another example, blind vehicle recovery may be provided for one or more handover blind vehicles. A handover vehicle may have a primary channel claimed from its outgoing zone but may not have knowledge of all free channels in the incoming zone. At least two situations may be possible. In a first situation, a vehicle may not be able to determine a secondary channel from the free channels belonging to its incoming zone. Therefore upon handover, the vehicle does not have a secondary channel that can become its primary channel in the incoming zone at the next resource claiming cycle. In a second situation, a vehicle may not be able to determine a new primary channel in the incoming zone since it does not have full knowledge of the free channels in the incoming zone. This may be different from a non-blind handover situation because in a non-blind handover, a vehicle may have full knowledge of the free channels in the incoming zone. This may allow the vehicle to claim a new primary channel at the next resource claiming cycle. In both situations, the vehicle may maintain its primary channel until the next resource claiming cycle, but the status of the primary channel may change to a temporary channel status when the vehicle leaves its outgoing zone, as previously described.

In at least one embodiment, the recovery of a handover blind vehicle may be enabled by providing a fast re-entry of the vehicle into the network upon handover. A fast re-entry may be enabled by having the blind vehicle(s) indicate in a transmission over its primary (temporary) channel its "blindness" upon a handover from zone i to zone i+1. One or more master vehicles of zone i+1 may then indicate one or more free channels of zone i+1 to the one or more handover blind vehicles. This indication may be provided in any way, including over dedicated time-frequency resources such as a broadcast channel.

In another example, blind vehicle recovery may be provided for one or more blind vehicles in zone i when zone i+1 is empty, meaning zone i+1 has no vehicle to act as a master to transmit information on the broadcast channel of zone i+1. Accordingly, a blind vehicle in zone i may simply just use a channel of zone i+1. The blind vehicle may use a specific channel of zone i+1 based on some pre-existing criteria, for example predefined rules, predefined mapping, etc., to reduce or eliminate the chance of two or more blind vehicles causing a resource collision when attempting to transmit on the same channel. In at least one embodiment, a blind vehicle may attempt to use a channel based on a specific channel index. In another embodiment, a blind vehicle may attempt to use a channel based on one or more predefined channel rotation patterns. Other channel selection options may be used.

According to another aspect of the present disclosure, one or more approaches are provided for enabling one or more vehicles to enter a vehicular ad hoc network. A vehicle may enter the network in number of different situations, for example when it arrives within communication range of other vehicles, when it enables its communications subsystem, etc. A vehicle attempting to enter the network may be referred to as a new vehicle.

In at least one embodiment, one or more other vehicles, such as master vehicles, may be used to broadcast or otherwise announce one or both of a location of a new vehicle and the identification of one or more channels for the new vehicle. These one or more other vehicles may be used to broadcast information about the new vehicle since the new vehicle may not be able to begin transmitting while other vehicles are not aware of its presence or location. This may allow other vehicles already in the network to learn information about a new vehicle, for example its presence, location, channels, etc.

When a new vehicle is attempting to access the network, the new vehicle may use its geographic location as a unique network identifier instead of, for example, a machine ID or media access control address (MAC address). A geographic coordinate, such as an x-y coordinate representing the position of a vehicle, may serve as a unique identifier for vehicle. There is a very low chance that two vehicles will have identical x-y coordinates during a short period in which the temporary identifier is used. However, it is to be appreciated that any other type of temporary identifier may be used.

Figure 11A:
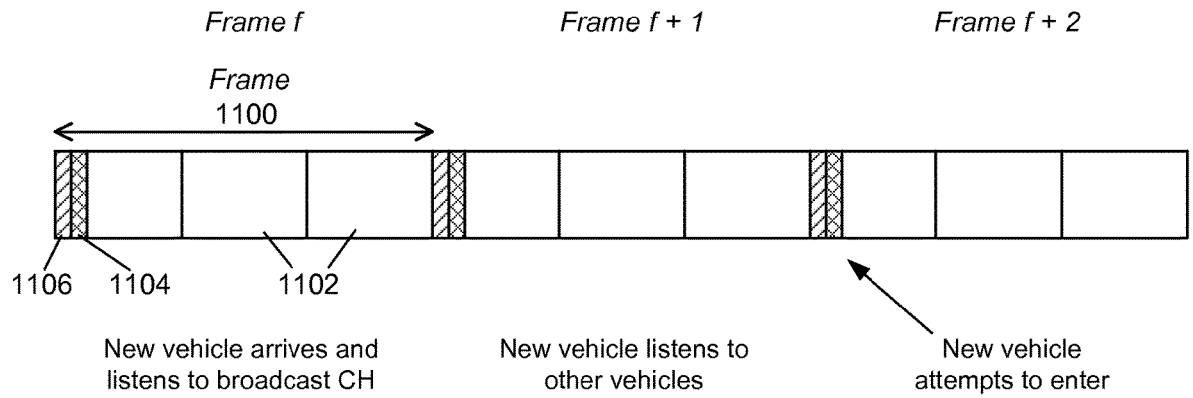
FIG. 11A is a transmission diagram showing frames and associated time slots in a vehicle network entry situation according to at least one embodiment.

An example embodiment is described with reference to FIG. 11A, which shows a number of frames 1100 f, f+1, f+2, each having sub-frames 1102, where at least some of frames 1100 have a broadcast channel 1104, as previously described. A vehicle in zone i that is attempting to enter the network arrives in time frame f and listens to a broadcast channel 1104. The vehicle may use information transmitted over the broadcast channel for a number of purposes, for example to determine a candidate zone for network entry, for achieving timing synchronization with the network, or to identify one or more free channels of a zone associated with a specific broadcast channel. It is possible for a node to listen to a plurality of different broadcast channels, each channel being associated with a different zone.

The new vehicle may listen to transmissions (e.g. broadcasts, beacon transmissions, etc.) of any other vehicles in zone i during a subsequent frame, for example frame f+1. This may allow the vehicle to determine information about zone i, for example the locations of any other vehicles in the zone.

The new vehicle may then attempt to enter the network during a subsequent frame, for example frame f+2. The vehicle may transmit a network entry request to one or more master vehicles in zone i. The entry request may include the location of the vehicle or any other information. One or more master vehicles may receive this information, and may then in turn broadcast the location of the one or more new vehicles as well as an identification of a primary channel for each of the one or more new vehicles.

The information broadcasted by the master vehicle(s) may be received by the one or more new vehicles as well as other vehicles in zone i. A new vehicle may determine if it has successfully entered the network based on the broadcast from the one or more master vehicles. For example, a new vehicle may determine the entry attempt has been successful if the master vehicle broadcast indicates an identification of a primary channel for the vehicle. On the other hand, if the entry attempt is not successful, the vehicle may re-attempt to enter the network. In at least one embodiment, a retry mechanism may be used, for example random backoff or any other suitable method.

The initial exchange between a new vehicle and one or more master nodes may be performed in any suitable way. For instance, specific time-frequency radio resources may be defined or dedicated for this purpose. In at least one embodiment, the initial exchange may be performed in a manner similar to a random access channel (RACH) procedure. Thus in some embodiments, one or more random access channels may be defined for this purpose, and may be configured in one or more time slots. In at least one embodiment, as shown in FIG. 11A, one or more slots 1106 are configured for this purpose, for example, at or near the beginning of a time window such as frame f. In other embodiments, initial access transmissions may be performed over one or more other shared channels as opposed to a channel dedicated only for initial access. In embodiments having a broadcast channel, the broadcast channel and the network entry random access channel may be configured in different time slots, or using other different time-frequency resources. It is to be appreciated, however, that radio resources may be defined or configured for the initial exchange in any other suitable way.

Figure 11B:
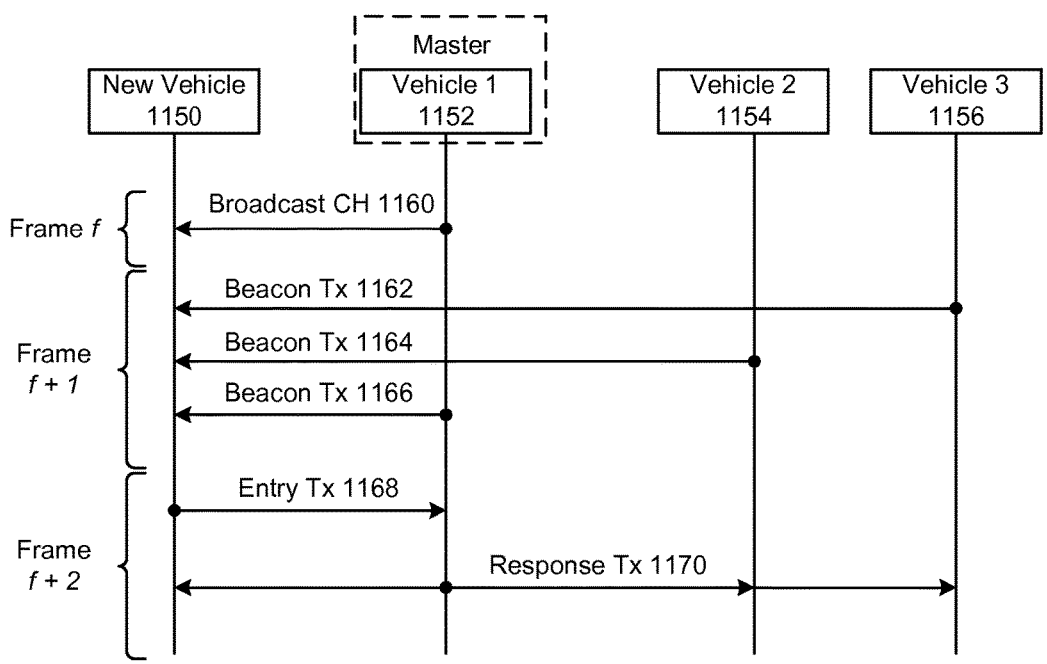
FIG. 11B is a dataflow diagram showing possible transmissions between vehicles in a network entry situation according to at least one embodiment.

FIG. 11B is a dataflow diagram showing some possible transmissions in at least one embodiment between a new vehicle and other vehicles in a zone in a network entry situation. Some of the transmissions were described above.

In this example, vehicles 1152, 1154 and 1156 are in a zone when new vehicle 1150 arrives at time frame f. Vehicle 1152 is serving as a master vehicle in the zone. At frame f, new vehicle 1150 listens to a broadcast channel (Broadcast CH) of one or more zones, here broadcast 1160. Due to the nature of broadcast 1160, it is sent to all nodes, but the following discussion will relate to the process as it pertains to new vehicle 1150. New vehicle 1150 may then listen to transmissions (e.g. broadcasts, etc.) of other vehicles in the zone, and in frame f+1 will receive beacon transmissions 1162, 1164, and 1166 from vehicles 1156, 1154 and 1152, respectively. In this figure, beacon transmissions are shown as being sent to all nodes as they are typically broadcast signals. However, in embodiments where beacons are not broadcast, the flows will be different than illustrated. It should be clear to those skilled in the art that the order of receipt of beacon transmissions can be different from that shown in FIG. 11B.

At frame f+2, new vehicle 1150 attempts to enter the network. Vehicle 1150 transmits a network entry message 1168 containing its location to master vehicle 1152, for example over a random access channel (RACH) or other channel for the initial exchange. In some embodiments, network entry message 1168 can contain more information than just the location of the node. If the network entry is successful, master vehicle 1152 can respond by broadcasting the location of new vehicle 1150 and an identification of its new channel to other vehicles in response transmission 1170. Transmission 1170 is shown as a broadcast message. By broadcasting message 1170 vehicles 1154 and 1156 are provided information about new vehicle 1150 and the channel that it will use. If the entry attempt is not successful, vehicle 1150 can re-attempt to enter the network (not shown).

According to another aspect of the present disclosure, resources in an ad hoc network may be defined based on Sparse Code Multiple Access (SCMA) modulation and waveform.

In at least some embodiments, using SCMA based resource definitions and other features may provide one or more benefits over existing approaches, for example including those that are based on code division multiple access (CDMA). One benefit may be increased connectivity, meaning that more channels may be defined and be made available for use as a result of SCMA resource definitions (e.g. SCMA layers, etc.). Another benefit may be one or both of increased reliability and lower delay for communications since with SCMA vehicles or other nodes perform codebook/pilot sensing as opposed to carrier sensing. Another benefit may be that SCMA supports blind detection to enable contention-based multiple access. This may assist in network entry for identifying active channels and their data. It may also help a blind node in a recovery process to identify active channels. It may further increase the robustness to channel collisions due to a blind node or a new node performing random access in the system.

Sparse Code Multiple Access (SCMA) is an encoding technique that encodes binary data streams directly to multi-dimensional codewords. By directly encoding the binary data to multi-dimensional codewords, SCMA encoding circumvents quadrature amplitude modulation (QAM) symbol mapping and can provide coding gains over conventional CDMA. SCMA may convey binary data using a multi-dimensional codeword rather than a QAM symbol. In addition, SCMA may provide multiple access through assigning a different codebook of multiplexed layers to different users. Furthermore, SCMA codebooks may comprise sparse codewords such that receivers may use low complexity message passing algorithms (MPAs) to detect their respective codewords amongst the multiplexed codewords. This can reduce baseband processing complexity on the receiver side.

Figure 12:
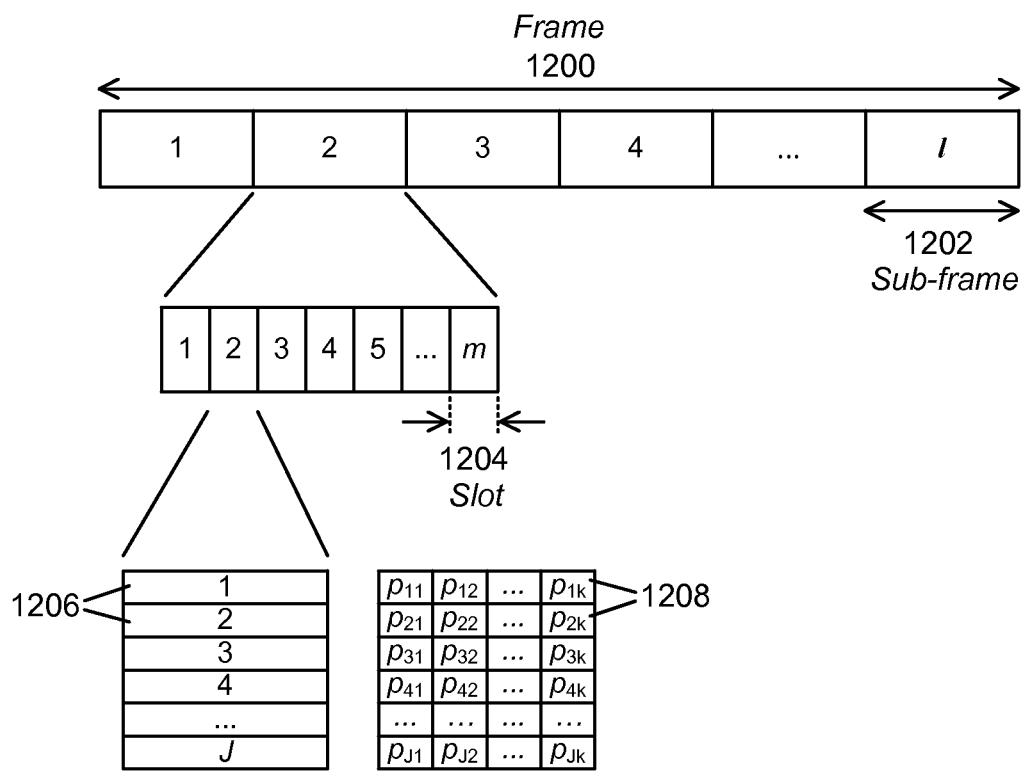
FIG. 12 is a transmission diagram showing a frame, slots, and SCMA layers according to at least one embodiment.

An example embodiment utilizing SCMA based resource definitions is shown in FIG. 12. An example frame 1200 is shown having several sub-frames 1202, and each sub-frame may have several slots 1204. A slot may be subdivided into one or more SCMA layers 1206. In FIG. 12, a slot is shown as having J layers. Again, in SCMA, multiple access may be provided through assigning different multiplexed layers to different users.

In at least one embodiment, a channel may be defined as at least one combination of a slot and a layer. For example, in FIG. 12, one channel may be defined as slot 2, layer 3. Another channel may be defined as slot 2, layer 4, and so on. Accordingly, a sub-frame 1202 having m slots 1204 and a slot 1204 having J layers 1206 may define m×J different channels.

Furthermore, it may be possible that two or more vehicles may claim channels that use the same SCMA layer and slot, for example slot 2, layer 6. In at least some embodiments, these vehicles may be able to use different pilots 1208 in an attempt to avoid a resource collision, for example in a dispersive environment. This may reduce the chance of pilot collisions even if an SCMA codebook collision occurs. Notably, an SCMA system is robust to codebook collisions as long as pilot collisions are avoided. In other words, codebook reuse may be tolerable in SCMA implementations.

An SCMA resource definition such as those described above may only work with vehicles capable of operating in full duplex mode. For example, two vehicles transmitting during the same time slot may be separated in SCMA layers but they may be unable to listen to each other during this time slot unless both vehicles operate in full duplex mode.

According to another aspect of the present disclosure, one or more approaches are provided below with reference to FIG. 13 for achieving a virtual full duplex mode for vehicles in an ad hoc network.

In some vehicular ad hoc networks, at least some vehicles are half duplex, meaning that they cannot transmit and listen simultaneously. Accordingly, when two or more vehicles each claim a channel in the same slot, although possibly with different layers, these vehicles transmit at the same time and therefore may not be able to listen to one another.

In at least some embodiments, a half duplex vehicle may be able to both transmit and listen to other vehicles during a single sub-frame. By ensuring that a half duplex node transmits in two different slots in a subframe, it is possible to create a mapping between a channel index and which slots of the subframe a node (having claimed the channel) will transmit in. By ensuring a sufficient number of timeslots and a diversity of index-to-slot mappings, it is possible to provide each node the ability to transmit and at the same time ensure it when it is listening, every other node is provided at least one opportunity to transmit. In this regard, the vehicle is considered to operate as a virtual full duplex node over the entire sub-frame.

Figure 13:
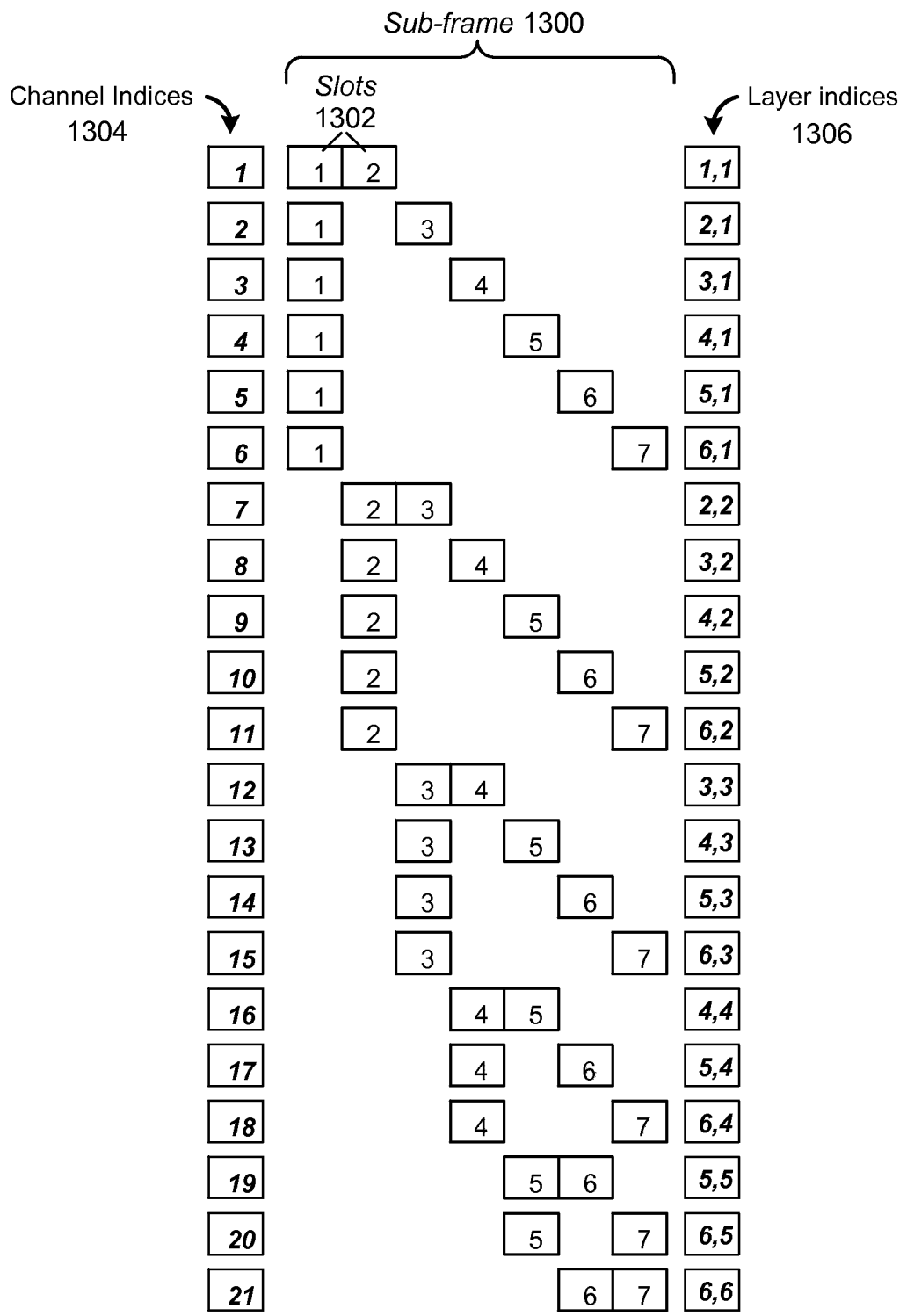
FIG. 13 is a resource definition diagram showing SCMA resource definitions according to at least one embodiment.

Reference is now made to FIG. 13, which shows how channels may be defined for one or more zones in an example embodiment to enable a virtual full duplex mode. This particular channel definition is based on Sparse Code Multiple Access (SCMA) encoding. However, this is not meant to be limiting. Other encoding schemes or resource definitions may be used.

In the example of FIG. 13, a sub-frame 1300 has 7 time slots 1302 (e.g. slots 1-7), and each slot may have 6 SCMA layers. A channel may be defined as comprising two slot/layer resources. This is similar to the example described with reference to FIG. 12.

In the present example, a channel is assigned two different slots. In other virtual full duplex embodiments, however, a channel may have more slots. A vehicle may transmit in both of the two slots and the payload in both slots may be essentially the same. Transmitting the same payload in different slots may provide multiple opportunities for other vehicles to listen. Since there are 7 slots and each channel is assigned two different slots, there are $(_2^7)=21$ different combinations. Thus in this example, up to 21 channels are supported. Channel indices 1304 (e.g. 1 to 21) are indicated in the left-most column in FIG. 13. The slot indices 1 to 7 are indicated in the middle seven columns. The layer indices 1306 are indicated in the right-most column and indicate the layers associated with each of the two slots of a channel. For example, channel 1 comprises slots 1 and 2, and has a layer index of 1,1. This indicates that the resources of channel 1 comprise slot 1, layer 1 and slot 2, layer 1. In other words, the layer index 1,1 indicates the layers of the first and second slots of a given channel. Providing another example, channel 8 has a slot index of 2,4 and a layer index of 3,2. Thus the resources of channel 8 are slot 2, layer 3 and slot 4, layer 2.

A virtual full duplex mode is described using another example with reference to FIG. 13. In this example, channels 1 to 6 are used by 6 different vehicles in a zone. All of these vehicles may transmit during slot 1, as shown in FIG. 13. Therefore none of these vehicles may be able to listen to one another during slot 1. However, the second slots in each of channels 1 to 6 each occur in a different time slot (slots 2 through 7). Therefore there is only one of the 6 vehicles transmitting in each of slots 2 to 7. Thus the other 5 vehicles are able to listen to the transmitting vehicle in each of slots 2 through 7. Therefore all of the 6 vehicles are able to both transmit and listen to each other within one sub-frame. The same applies for all 21 channels in the example of FIG. 13.

One or more listening vehicles may be able to receive transmissions over different channels in the same slot as a result of the different SCMA layers defined in a given slot. For example, a vehicle that has claimed channel 7 is listening (i.e. not transmitting) on slot 1 when two different vehicles may be transmitting in slot 1 on channels 1 and 2. The transmission on channel 1 in slot 1 uses layer 1, whereas the transmission on channel 2 in slot 1 uses slot 2. Therefore the listening vehicle may be able to receive and process both of these transmissions on slot 1 using the different SCMA layers.

The number of slots, layers and the channel definitions used in the embodiment shown in FIG. 13 are provided as examples only and are not meant to be limiting. In one or more other embodiments, different configurations may be used. For example, a channel may be defined to include 3 or more slots. Other configurations and options are possible.

As previously described, in some embodiments a single vehicle may claim and use more than one channel of a given zone. This may lead to some issues, including in some embodiments of the virtual full duplex mode described above. One possible issue is described with reference to FIG. 14, which is based on the example resource definitions provided in the example of FIG. 13.

Figure 14:
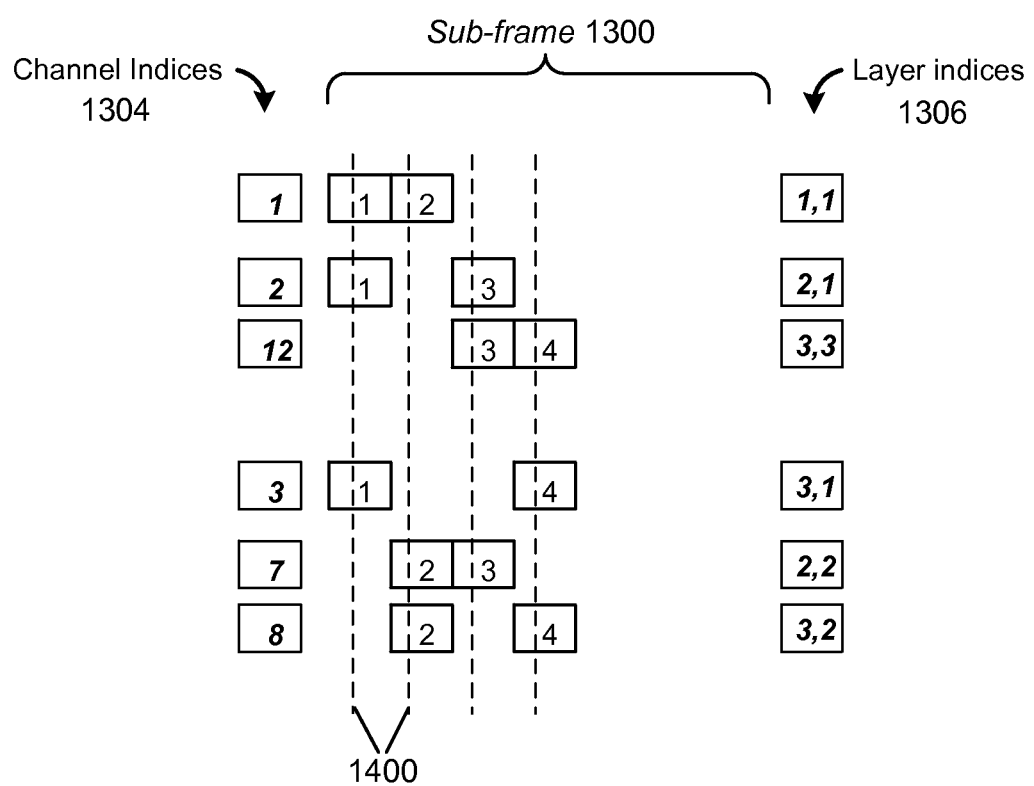
FIG. 14 is a resource definition diagram showing a subset of the resource definitions shown in FIG. 13.

In the example of FIG. 14, a first vehicle claims channels 1, 2 and 12. Therefore the first vehicle may transmit on slots 1, 2, 3, and 4, and thus may not be able to listen at any of these slots. Channels 3, 7, and 8 are also shown, which only have slots assigned in slots 1 through 4. Therefore if a second vehicle in a zone only claims one or more of channels 3, 7, and 8, then the first vehicle may never be able to listen to the second vehicle when the first vehicle is transmitting during all of slots 1 through 4, as indicated by dashed lines 1400. For example, if a second vehicle has claimed channel 3, the second vehicle transmits on slots 1 and 4. However, since a first vehicle that has claimed channels 1, 2 and 12 may be transmitting on all of slots 1 to 4, the first vehicle may be unable to hear the second vehicle.

The present disclosure provides one or more solutions to this type of problem, which were previously described. One such solution involves a vehicle in particular zone claiming one or more channels (e.g. secondary channels, etc.) from among free channels in one or more other zones. In at least some embodiments, a channel of a different zone may be configured with slots in a different sub-frame or other time-frequency resources, thereby eliminating the possibility of the problem situation described in relation to FIG. 14.

The present disclosure refers to channel sharing algorithms that may be implemented in vehicles of an ad hoc network to provide for the sharing and managing of communication resources in a decentralized manner. A channel sharing algorithm may enable each vehicle to determine when it may claim and use a resource with little or no risk of a resource collision as well as to be aware of resources claimed by other vehicles. In addition, a channel sharing algorithm may allow vehicles to perform one or more other processes according to the present disclosure, including claiming secondary channels, new vehicle network entry, and vehicle handover.

One skilled in the art will appreciate that although the above described embodiments make reference to zones as being adjacent to each other on a grid, this is simply one embodiment. In another embodiment, zones have start points, but not end points. This results in zones overlapping. Each vehicle travelling in a predefined direction will attempt to claim, as its primary channel, an available channel in the zone in which the vehicle is closest to the start of the zone. As a secondary channel, the vehicle will attempt to claim a channel in the zone that has the next closest start point. Vehicles travelling in the opposite direction to the predefined direction (if they share the same zones) will claim a primary a channel in the zone after the next starting point. With reference to FIG. 5A, zone i starts at edge 536, but does not end. Zone i+1 starts at the next illustrated boundary, but does not end. Thus all vehicles in zone i, are also in zone i+1.

In such an embodiment, the method of claiming channels is unchanged. If a vehicle determines that it would like to claim a secondary channel, it can do so by simply claiming a channel from the next zone.

It should be further understood that a vehicle, upon determining that it has no responsibility in a zone, and is about to enter a different zone, may choose to only claim a channel in the zone that it is about to enter. This can also be viewed as a dynamic change in the starting point of a zone, which will revert when the vehicle passes the original zone boundary.

With overlapping zones (zones designated by a start but not an end, it is possible for vehicles on a lightly loaded road to all claim channels in the highest numbered zone, so that they still exchange information. The reach of a vehicle can be expanded by having the next vehicle on the road act as a relay when larger sized zones are dynamically created.

It will also be understood by those skilled in the art, that although a number of figures have shown the application of zones to a single lane of traffic, in implementation, zones can be implemented to include more than one lane of traffic, and can also include traffic in more than one direction. Similarly, it will be understood that a multi-lane road may have a series of consecutive zones in each lane, creating a grid like overlay for the road. Different directions of traffic can have different start and end points for zones, so that channels in zones are allocated based on the vehicle closest to leaving a zone for each direction of travel. Where a multilane road has a grid of zones covering the different lanes, it should be understood that it is not necessary to have the zones line up their start and end points.

Through the descriptions of the preceding embodiments, the teachings of the present disclosure may be implemented by using hardware only or by using a combination of software and hardware. Software or other computer executable instructions for implementing one or more embodiments, or one or more portions thereof, may be stored on any suitable computer readable storage medium. The computer readable storage medium may be a tangible or in transitory/non-transitory medium such as optical (e.g., CD, DVD, Blu-Ray, etc.), magnetic, hard disk, volatile or non-volatile, solid state, or any other type of storage medium known in the art.

Furthermore, although embodiments have been described in the context of vehicular communications, the scope of the present disclosure is not intended to be limited to vehicles or vehicle communications. The teachings of the present disclosure may be used or applied in other applications and in other fields. Therefore teachings herein that relate to vehicles and vehicle communications generally apply to other types of nodes, mobile nodes, user equipments (UEs), transmission points, network elements, sensors, machines, and other types of devices, as well as other types of communications and networks. The present teachings are also intended to apply to networks other than vehicular ad hoc networks, for example other mobile node ad hoc networks.

Additional features and advantages of the present disclosure will be appreciated by those skilled in the art.

The structure, features, accessories, and alternatives of specific embodiments described herein and shown in the Figures are intended to apply generally to all of the teachings of the present disclosure, including to all of the embodiments described and illustrated herein, insofar as they are compatible. In other words, the structure, features, accessories, and alternatives of a specific embodiment are not intended to be limited to only that specific embodiment unless so indicated.

Moreover, the previous detailed description is provided to enable any person skilled in the art to make or use one or more embodiments according to the present disclosure. Various modifications to those embodiments will be readily apparent to those skilled in the art, and the generic principles defined herein may be applied to other embodiments without departing from the spirit or scope of the teachings provided herein. Thus, the present methods, systems, and or devices are not intended to be limited to the embodiments disclosed herein. The scope of the claims should not be limited by these embodiments, but should be given the broadest interpretation consistent with the description as a whole. Reference to an element in the singular, such as by use of the article "a" or "an" is not intended to mean "one and only one" unless specifically so stated, but rather "one or more". All structural and functional equivalents to the elements of the various embodiments described throughout the disclosure that are known or later come to be known to those of ordinary skill in the art are intended to be encompassed by the elements of the claims.

Furthermore, nothing herein is intended as an admission of prior art or of common general knowledge. In addition, citation or identification of any document in this application is not an admission that such document is available as prior art, or that any reference forms a part of the common general knowledge in the art. Moreover, nothing disclosed herein is intended to be dedicated to the public regardless of whether such disclosure is explicitly recited in the claims.

The following clauses describe further aspects of the present disclosure:

1. A method in a vehicle to vehicle ad hoc network, comprising:
   receiving, at a new node in a first zone of a virtual grid, information indicating the availability of a communication channel of the first zone, the new node having no claimed channels; and
   transmitting, at the new node, a network entry request indicating a request for a primary channel for the new node.
2. The method of clause 1 wherein the step of transmitting includes transmitting the network entry request to a master node associated with the first zone.
3. The method of clause 1, wherein the information indicating availability is received at the new node over at least one of a beacon transmission from a second node in the first zone and a broadcast channel of the first zone.
4. The method of clause 1, further comprising, receiving at the new node in response to the network entry request, an indication of a primary channel for claiming by the new node.
5. The method of clause 1, wherein the network entry request includes information indicating the location of the new node.
6. A node for operating in a vehicle to vehicle ad hoc network, the node comprising:
   a processor;
   a communications subsystem; and
   a computer readable storage medium storing instructions that when executed by the processor cause the first node to:
   decode an indication of the availability of a communication channel of a first zone of a virtual grid from information received through the communications subsystem, the node being in the first zone and having no claimed channels; and
   transmit, at the node, a message indicating a network entry request indicating a request for a primary channel for the new node.
7. A method in a vehicle to vehicle ad hoc network, comprising:
   receiving, at a first node located in a first zone of a virtual grid in the ad hoc network, information indicating the availability of a first communication channel of a second zone; and
   claiming, at the first node, the first channel as a secondary channel of the first node.
8. The method of clause 7, wherein prior to the receiving, the first node has insufficient information on the availability of the first channel such that the first node is unable to claim the first channel as a secondary channel.
9. The method of clause 7, wherein at least part of the received information is received from a second node located in a zone other than the first zone over a broadcast channel.
10. The method of clause 7, wherein the claiming is based on a position of the first node relative to a position of a second node.
11. The method of clause 10, wherein the relative position of the first and second nodes is determined based on a distance of each the first and second nodes to a reference location.
12. The method of clause 11, wherein the reference location comprises an edge of a zone in the virtual grid.
13. The method of clause 7, wherein the claiming occurs at a first time for a transmission by the first node on the secondary channel at a subsequent time.
14. The method of clause 7, wherein the first channel comprises a sparse code multiple access (SCMA) layer.
15. A first node for operating in a vehicle to vehicle ad hoc network, the first node comprising:
   a processor;
   a communications subsystem; and
   a computer readable storage medium storing that when executed by the processor cause the first node to:
   decode, at the first node when the first node is located in a first zone of a virtual grid in the network, an indication of the availability of a first communication channel of a second zone from information received through the communications subsystem; and
   transmit a message indicating the claiming of the first channel as a secondary channel of the first node.
16. A method in a vehicle to vehicle ad hoc network, comprising:
   transmitting, at a first node in a second zone in a virtual grid of the network, a blindness indication, the first node having entered the second zone from a first zone and the blindness indication indicating the first node has incomplete information on the availability of communication channels of the second zone.
17. The method of clause 16, further comprising, receiving at the first node in response to the transmitting, information indicating one or more available channels of the second zone.
18. The method of clause 17, further comprising claiming, at the first node, at least one of the one or more available channels of the second zone as a primary channel of the first node.
19. The method of clause 18, wherein the claiming is based on a position of the first node relative to the position of a second node.
20. The method of clause 19, wherein the relative position of the first and second nodes is determined based on a distance of each the first and second nodes to a reference location.
21. A first node for operating in a vehicle to vehicle ad hoc network, the first node comprising:
   a processor;
   a communications subsystem; and
   a computer readable storage medium storing instructions that when executed by the processor cause the first node to:
   transmit, at the first node in a second zone in a virtual grid of the network, a blindness indication, the first node having entered the second zone from a first zone and the blindness indication indicating the first node has incomplete information on the availability of communication channels of the second zone.
22. A method in a vehicle to vehicle ad hoc network, comprising:
   broadcasting, at a node located in a first zone of a virtual grid in the ad hoc network, information indicating the availability of a communication channel of the first zone.
23. The method of clause 22, wherein the node is a master node of the first zone responsible for performing the broadcasting.
24. The method of clause 22, wherein the broadcasting occurs on a dedicated broadcasting channel.
25. A node for operating in a vehicle to vehicle ad hoc network, the node comprising:

a processor;

a communications subsystem; and a computer readable storage medium storing instructions that when executed by the processor cause the node to:

transmit, at the node when the node is located in a first zone of a virtual grid in the ad hoc network, information indicating the availability a communication channel of the first zone.

26. A method in a vehicle to vehicle ad hoc network, comprising:

determining, at a first node in the network, that the first node has moved from a first zone to a second zone in a virtual grid;

if the first node has claimed a communication channel of the second zone as a secondary channel, changing a status of the channel from a secondary channel to a primary channel of the first node; and if the first node has not claimed a communication channel of the second zone as a secondary channel, claiming, at the first node, an available channel of the second zone as a primary channel of the first node.

27. The method of clause 26, wherein if the first node has claimed a channel of the first zone as a primary channel when the first node moves into the second zone, releasing, at the first node, this channel of the first zone.

28. The method of clause 26, wherein the claiming of the channel of the second zone as a primary channel is based on a position of the first node relative to the position of a second node.

29. The method of clause 28, wherein the relative position of the first and second nodes is determined based on a distance of each the first and second nodes to a reference location.

30. The method of clause 26, wherein the claiming of the primary channel for the first node occurs at a first time for transmission by the first node at a subsequent time.

31. A first node for operating in a vehicle to vehicle ad hoc network, the first node comprising:

a processor;

a communications subsystem; and a computer readable storage medium storing instructions that when executed by the processor cause the first node to:

determine that the first node has moved from a first zone to a second zone in a virtual grid;

if the first node has claimed a communication channel of the second zone as a secondary channel, change a status of the channel from a secondary channel to a primary channel of the first node; and if the first node has not claimed a communication channel of the second zone as a secondary channel, claim, at the first node, an available channel of the second zone as a primary channel of the first node.

What is claimed:

1. A method in a vehicle to vehicle (V2V) ad hoc network, the method comprising:

receiving, at a first node in the V2V ad hoc network, information identifying free communication channels in a zone;

receiving, at the first node, information indicating a second ranking of a second node in the V2V ad hoc network, the second ranking of the second node being based on a second distance of the second node to an edge of the zone where the first node is located in a virtual grid; and claiming, at the first node, a first communication channel from the free communication channels in the V2V ad hoc network based on the free communication channels identified in the received information and a first ranking of the first node relative to the second ranking of the second node, the first ranking of the first node being based on a first distance of the first node to the edge of the zone, and the first node being different than the second node, the claiming comprising:

selecting the first communication channel from the free communication channels based on a comparison between an order of the free communication channels identified in the received information and the first ranking of the first node relative to the second ranking of the second node.

2. The method of claim 1, wherein the first communication channel claimed by the first node comprises a sparse code multiple access (SCMA) layer.

3. The method of claim 2, wherein the zone is a first zone in the virtual grid and the claimed first communication channel is configured for the first zone, and wherein a plurality of channels of the first zone each comprises a corresponding SCMA layer defined over each of at least two different time slots in a sub-frame, a same payload to be transmitted during the at least two different time slots, a combination of at least two time slots and their respective SCMA layers of each channel being unique in the first zone, such that a node of the V2V ad hoc network having claimed a communication channel of the first zone is able to both listen to a transmission of every other node having claimed another communication channel of the first zone and to have every other node having claimed the another communication channel of the first zone listen to a transmission of the first node during a single sub-frame.

4. The method of claim 1, wherein the zone is a first zone in the virtual grid, the claimed first communication channel belongs to the first zone, and the claimed first communication channel serves as a primary channel of the first node, and the method further includes claiming a second channel as a secondary channel, the second channel being an available channel of a second zone in the virtual grid other than the first zone.

5. The method of claim 4, wherein the second zone is adjacent to the first zone.

6. The method of claim 4, wherein the second zone overlaps the first zone.

7. The method of claim 1, further comprising identifying, at the first node, a channel in the V2V ad hoc network available for claiming by the second node, the identifying based on the first ranking of the first node relative to the second ranking of the second node.

8. The method of claim 1, further comprising:

receiving, at the first node, information indicating a third ranking of a third node in the V2V ad hoc network, wherein the claiming of the first communication channel at the first node is based on the first ranking of the first node relative to the second ranking of the second node and the third ranking of the third node.

9. The method of claim 1, wherein the receiving of the information indicating the second ranking occurs at a first time and the first communication channel claimed at the first node is used for a transmission by the first node at a second time, subsequent to the first time.

10. The method of claim 1, further comprising broadcasting, at the first node, information indicating the first ranking of the first node.

11. The method of claim 1, wherein the zone is a second zone in the virtual grid of the V2V ad hoc network and the first node having entered the second zone from a first zone, the method further comprising, prior to claiming the first communication channel:

transmitting, at the first node, a blindness indication indicating the first node has incomplete information on availability of communication channels of the second zone.

12. The method of claim 1, further comprising after the claiming:

determining, at the first node, that the first node has moved from the zone to a second zone in the virtual grid;

if the first node has claimed a second communication channel of the second zone as a secondary channel, changing a status of the second communication channel from the secondary channel to a primary channel of the first node; and if the first node has not claimed the second communication channel of the second zone as the secondary channel, claiming, at the first node, an available channel of the second zone as the primary channel of the first node.

13. The method of claim 1, further comprising:

before the claiming, calculating the first distance of the first node to the edge of the zone.

14. A first node for operating in a vehicle to vehicle (V2V) ad hoc network, the first node comprising:

a processor;

a communications subsystem; and a computer readable storage medium storing instructions that when executed by the processor cause the first node to:

receive information identifying free communication channels in a zone;

determine a second ranking of a second node in the V2V ad hoc network from information received through the communications subsystem, the second ranking of the second node being based on a second distance of the second node to an edge of the zone where the first node is located in a virtual grid; and transmit a message indicating claiming of a first communication channel in the V2V ad hoc network for the first node, the first communication channel being selected from the free communication channels based on a comparison between an order of the free communication channels identified in the received information and a first ranking of the first node relative to the second ranking of the second node, the first ranking of the first node being based on a first distance of the first node to the edge of the zone, and the first node being different than the second node.

15. The first node of claim 14, wherein the first communication channel claimed by the first node comprises a sparse code multiple access (SCMA) layer.

16. The first node of claim 15, wherein the zone is a first zone in the virtual grid and the claimed first communication channel is configured for the first zone, and wherein a plurality of channels of the first zone each comprises a corresponding SCMA layer defined over each of at least two different time slots in a sub-frame, a same payload to be transmitted during the at least two different time slots, a combination of at least two time slots and their respective SCMA layers of each channel being unique in the first zone, such that a node of the V2V ad hoc network having claimed a communication channel of the first zone is able to both listen to a transmission of every other node having claimed another communication channel of the first zone and to have every other node having claimed the another communication channel of the first zone listen to a transmission of the first node during a single sub-frame.

17. The first node of claim 14, wherein the zone is a first zone in the virtual grid, the claimed first communication channel belongs to the first zone, and the claimed first communication channel serves as a primary channel of the first node, and the instructions further causing the first node to indicate in the message or another transmitted message the claiming of a second channel as a secondary channel, the second channel being an available channel of a second zone in the virtual grid other than the first zone.

18. The first node of claim 17, wherein the second zone is adjacent to the first zone.

19. The first node of claim 17, wherein the second zone overlaps the first zone.

20. The first node of claim 14, wherein the instructions further cause the first node to:

identify, at the first node, a channel in the V2V ad hoc network available for claiming by the second node based on the first ranking of the first node relative to the second ranking of the second node.

21. The first node of claim 14, wherein the instructions further cause the first node to:

decode a third ranking of a third node in the V2V ad hoc network from information received through the communications subsystem, wherein the claiming of the first communication channel at the first node is based on the first ranking of the first node relative to the second ranking of the second node and the third ranking of the third node.

22. The first node of claim 14, wherein the of information for determining the second ranking is received at a first time and the first communication channel claimed at the first node is used for a transmission by the first node at a second time, subsequent to the first time.

23. The first node of claim 14, wherein the instructions further cause the first node to:

broadcast, at the first node, information indicating the first ranking of the first node.

24. The first node of claim 14, wherein when the zone is a second zone in the virtual grid of the V2V ad hoc network and the first node has entered the second zone from a first zone, the instructions further causing the first node to, prior to transmitting the message indicating the claiming of the first communication channel:

transmit, at the first node, a blindness indication indicating the first node has incomplete information on availability of communication channels of the second zone.

25. The first node of claim 14, wherein the instructions further cause the first node to, after claiming the first communication channel:

determine that the first node has moved from the zone to a second zone in the virtual grid;

if the first node has claimed a second communication channel of the second zone as a secondary channel, change a status of the second communication channel from the secondary channel to a primary channel of the first node; and if the first node has not claimed the second communication channel of the second zone as the secondary channel, claim, at the first node, an available channel of the second zone as the primary channel of the first node.

* * * * *